US007738392B2

(12) United States Patent
Walter et al.

(10) Patent No.: US 7,738,392 B2
(45) Date of Patent: Jun. 15, 2010

(54) METHODS AND APPARATUS TO PROVIDE SERVICES OVER INTEGRATED BROADBAND COMMUNICATION SYSTEMS

(75) Inventors: Edward Walter, Boerne, TX (US); Michael Raftelis, San Antonio, TX (US)

(73) Assignee: AT&T Intellectual Property I, L.P., Reno, NV (US)

( * ) Notice: Subject to any disclaimer, the term of this patent is extended or adjusted under 35 U.S.C. 154(b) by 836 days.

(21) Appl. No.: 11/533,635

(22) Filed: Sep. 20, 2006

(65) Prior Publication Data

US 2008/0069006 A1    Mar. 20, 2008

(51) Int. Cl.
*H04J 1/16* (2006.01)
*H04J 3/16* (2006.01)

(52) U.S. Cl. ..................... 370/252; 370/465
(58) Field of Classification Search ................ 370/235, 370/252, 247–248, 463, 465; 709/225, 223, 709/229
See application file for complete search history.

(56) References Cited

U.S. PATENT DOCUMENTS

| | | | |
|---|---|---|---|
| 5,757,801 A | | 5/1998 | Arimilli |
| 6,307,839 B1 | | 10/2001 | Gerszberg et al. |
| 6,388,990 B1 | * | 5/2002 | Wetzel ........................ 370/230 |
| 6,594,826 B1 | * | 7/2003 | Rao et al. ...................... 725/95 |
| 6,625,119 B1 | | 9/2003 | Schuster et al. |
| 6,625,650 B2 | | 9/2003 | Stelliga |
| 6,763,392 B1 | * | 7/2004 | del Val et al. ................ 709/231 |
| 6,859,440 B1 | * | 2/2005 | Sonti et al. ................... 370/252 |
| 7,317,754 B1 | * | 1/2008 | Remy et al. .................. 375/222 |
| 2002/0054578 A1 | | 5/2002 | Zhang et al. |
| 2003/0046704 A1 | * | 3/2003 | Laksono et al. ............... 725/96 |
| 2004/0006771 A1 | | 1/2004 | Dale et al. |
| 2004/0103193 A1 | | 5/2004 | Pandya et al. |
| 2004/0203580 A1 | * | 10/2004 | Engelhart .................... 455/406 |
| 2004/0243707 A1 | * | 12/2004 | Watkinson .................. 709/225 |
| 2005/0015493 A1 | | 1/2005 | Anschutz et al. |
| 2005/0052992 A1 | | 3/2005 | Cloonan et al. |
| 2005/0091505 A1 | * | 4/2005 | Riley et al. .................. 713/182 |
| 2005/0195741 A1 | | 9/2005 | Doshi et al. |
| 2005/0237952 A1 | * | 10/2005 | Punj et al. .................... 370/260 |
| 2006/0046584 A1 | * | 3/2006 | Gaia et al. ..................... 440/75 |
| 2006/0239271 A1 | * | 10/2006 | Khasnabish et al. ..... 370/395.21 |
| 2008/0046584 A1 | * | 2/2008 | Tucker ....................... 709/231 |

* cited by examiner

*Primary Examiner*—Steven H Nguyen
*Assistant Examiner*—Candal Elpenord
(74) *Attorney, Agent, or Firm*—Hanley, Flight & Zimmerman, LLC.

(57) ABSTRACT

Methods and apparatus to provide services over integrated broadband communication systems include an example method to manage access to a communication link to a customer premises. Such an example method comprises determining a data rate for the communication link, determining whether the customer premises utilizes a predetermined service, identifying the communication link as disabled when the customer premises does not utilize the predetermined service and the data rate is below a first rate, and identifying the communication link as enabled for the predetermined service and disabled for at least one other service when the customer premises utilizes the predetermined service and the data rate is below the first rate and above a second rate.

18 Claims, 11 Drawing Sheets

US 7,738,392 B2

METHODS AND APPARATUS TO PROVIDE SERVICES OVER INTEGRATED BROADBAND COMMUNICATION SYSTEMS

FIELD OF THE DISCLOSURE

This disclosure relates generally to integrated broadband communication systems and, more particularly, to methods and apparatus to provide services over integrated broadband communication systems.

BACKGROUND

In today's competitive environment, telecommunication service providers endeavor to integrate services onto a single broadband communication link. For example, many service providers strive to be a subscriber's sole source of the "triple play services" of television (e.g., internet protocol television (IPTV)), telephone (e.g., voice over internet protocol (VoIP)) and Internet (e.g., data and email services). Digital subscriber line (DSL) and other broadband access technologies enable the triple play services to be integrated onto a single communication link between a customer premises and the service provider's network. Conventional broadband access techniques are designed to guaranty a minimum bandwidth or data rate over the communication link to the customer premises to ensure delivery of all of the services to which the customer premises has subscribed. If this minimum bandwidth or data rate cannot be guaranteed, for example, due to weather conditions, equipment outages, etc., then the conventional broadband access techniques completely disable the communication link to avoid providing services that do not meet the obligations of the subscriber's subscription agreement until the minimum bandwidth/data rate can be achieved.

DETAILED DESCRIPTION

Figure 1:
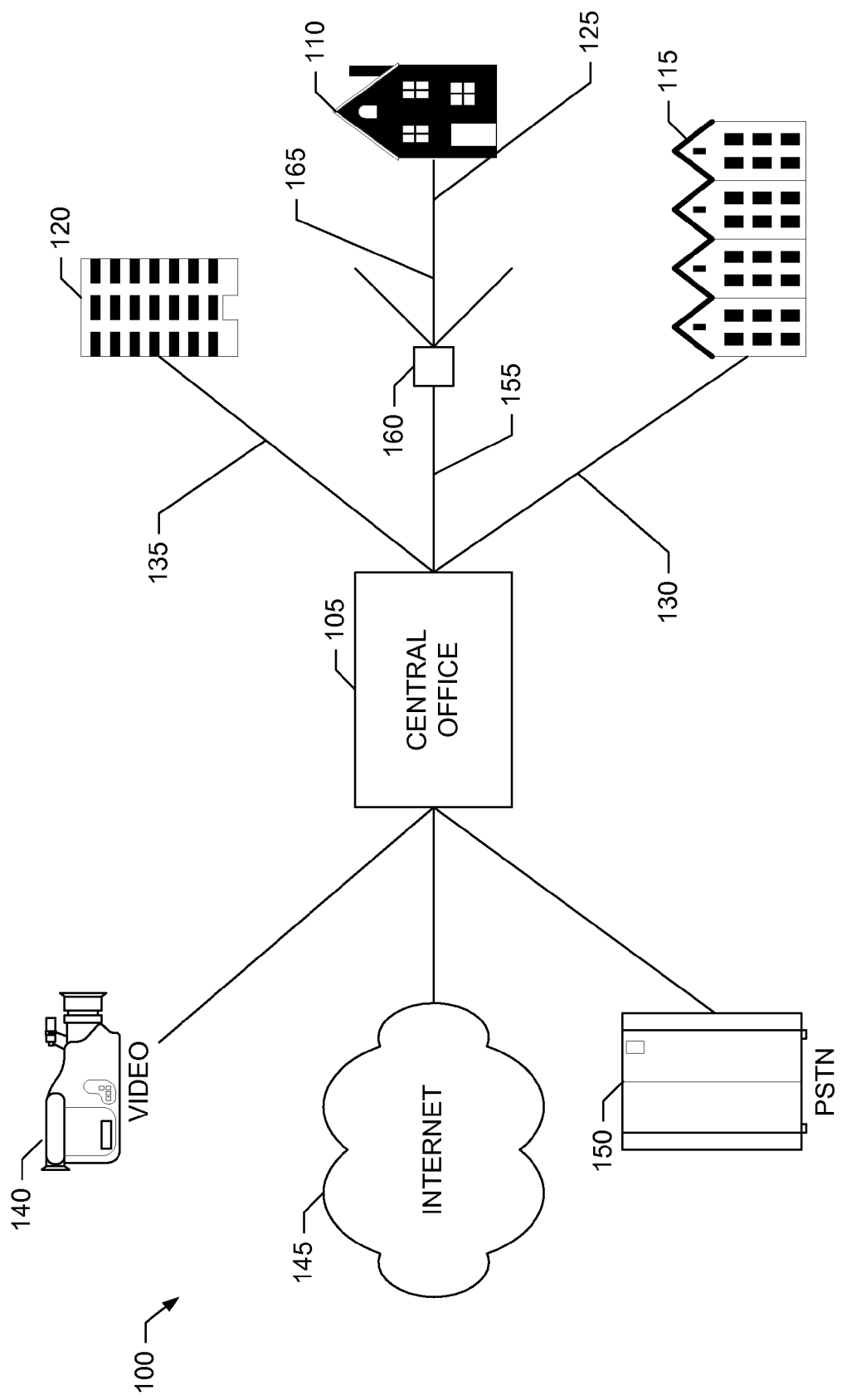
FIG. 1 is a block diagram of an example integrated broadband communication system capable of supporting the link access management techniques disclosed herein.

Example methods and apparatus to provide link access management in a broadband communication system providing integrated services are disclosed herein. In an example implementation of an integrated broadband communication system, multiple services are provided by a service provider over a communication link to a customer premises. Example services may include, but are not limited to, any or all of the "triple play services" of television service, internet service and telephone service. The multiple services are "integrated" in the sense that they are provided by the same service provider and share the available bandwidth of the communication link. As such, the communication link in the example integrated broadband communication system is configured to support a data rate that is nominally the aggregate of the required minimum data rates for the individual services (referred to herein as an "aggregated data rate"). In some example broadband communication systems, a maximum and minimum acceptable aggregated data rate may be established for the communication link, wherein the minimum acceptable aggregated data rate is defined as the data rate required to simultaneously deliver all services to which the customer premises has subscribed.

Various phenomena may cause the communication link to be unable to support the minimum acceptable aggregated data rate. Such phenomena may include, but are not limited to, weather outages, equipment outages, network maintenance outages, unexpected service interruptions, etc. Example methods and apparatus disclosed herein provide link access management for the communication link by monitoring the data rate available over the communication link to determine whether the link is able to support the complete set of services provided to the customer premises. If the monitored data rate falls below the minimum acceptable aggregated data rate, some example link access management methods and/or apparatus disclosed herein determine whether the link should be disabled or remain enabled for a limited set of predetermined priority services (which is less than the complete set of services to which the subscriber has subscribed and may include one or more services). Additionally or alternatively, some example link access management methods and/or apparatus disclosed herein determine whether any or all of the limited set of priority services require one or more modifications to be made available within the reduced (sub-aggregated) bandwidth of the degraded communication link. Example modifications may include, but are not limited to, compressing the data associated with the affected service to fit within the reduced bandwidth, lowering the quality of the affected service, utilizing different codecs to provide the affected service, etc.

In some example link access management methods and/or apparatus disclosed herein, bandwidth and/or service indications are provided to the customer premises to indicate the bandwidth and/or services available over the communication link at the current time. The service indications may also indicate whether one or more services have been modified to be made available within a reduced bandwidth associated with a degraded communication link. Additionally or alternatively, some example link access management methods and/or apparatus disclosed herein may provide emergency notifications to the service provider and/or the customer premises when the communication link becomes degraded or, in other words, the data rate available over the communication link falls below the minimum acceptable aggregate data rate. Such emergency notifications may include, but are not limited to, sending outage notifications to the service provider, causing phones to ring at the customer premises with a special ringtone, causing a pre-recorded message to be played at the customer premises via a telephone, television, computer, etc.

Figure 2:
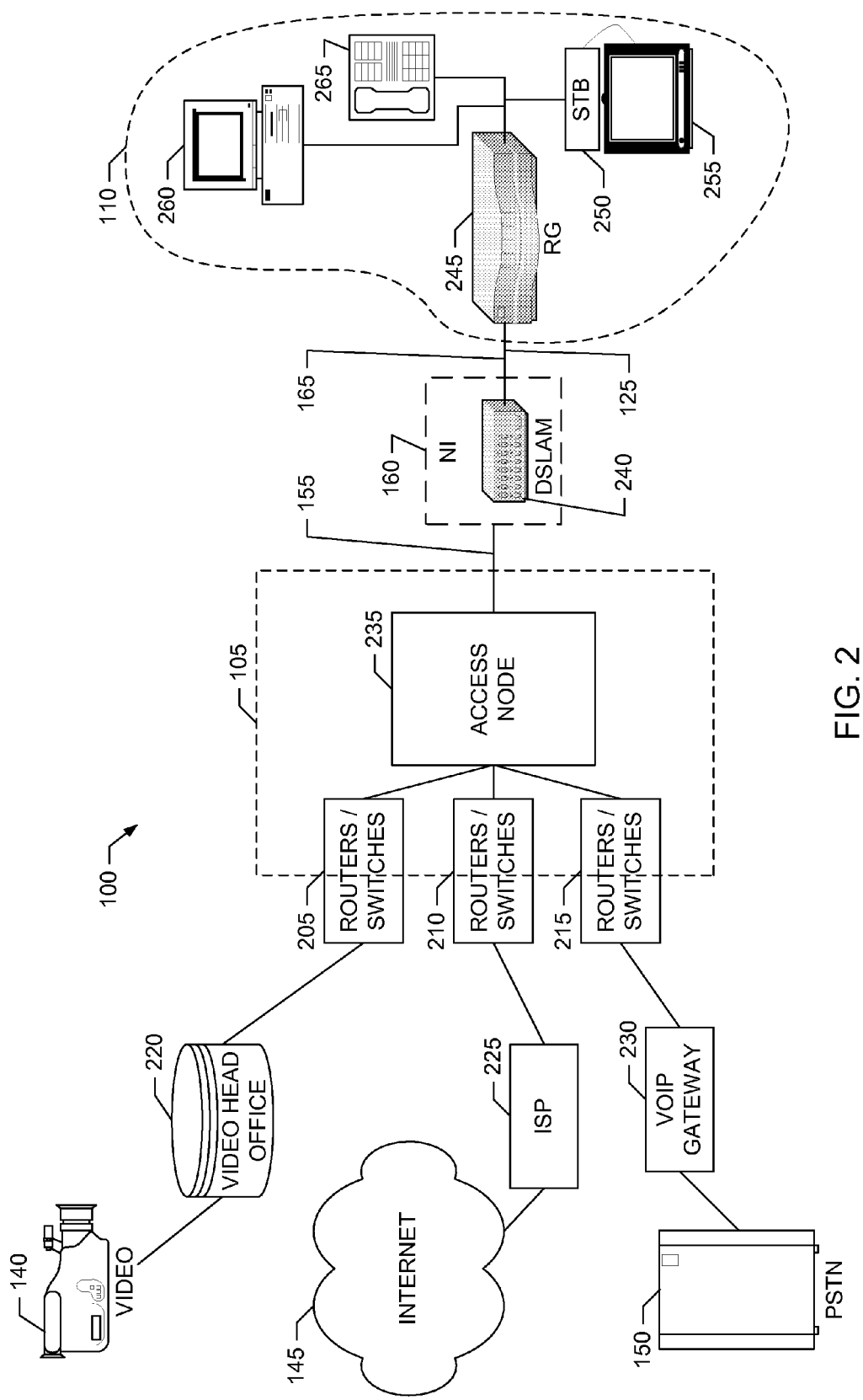
FIG. 2 is a more detailed block diagram of the example integrated broadband communication system of FIG. 1.

The example link access management methods and/or apparatus disclosed herein may be more fully understood in the context of the example integrated broadband communication system 100 depicted in FIGS. 1 and 2. A block diagram of the example integrated broadband communication system 100 is shown in FIG. 1. The example integrated broadband communication system 100 may be implemented by a service provider using any type of broadband communication system, such as, for example, an internet protocol television (IPTV) system (e.g., such as AT&T's Project Lightwave), a digital subscriber line (DSL) communication system (e.g., such as a DSL system implemented using asymmetric DSL (ADSL), very high data rate DSL (VDSL), etc.), a cable television communication system, a satellite communication system, a microwave communication system, etc.

The example integrated broadband communication system 100 includes a central office 105 to provide services to a plurality of customer premises 110, 115, 120 via a plurality of respective communication links 125, 130, 135. The service provider uses the central office 105 to aggregate services, such as, for example, one or more video services 140, one or more internet services 145 and one or more telephone services 150. As such, the integrated broadband communication system 100 of the illustrated example is configured to provide the "triple play services" of telephone service (e.g., PSTN and/or VoIP service), video service (e.g., IPTV service) and internet service to one or more of the customer premises 110, 115, 120. For example, the customer premises 110 may subscribe to all of the triple play services provided by the service provider (e.g., voice service, video service and internet service), whereas the customer premises 115 may subscribe to only video service and internet service, and/or the customer premises 120 may subscribe to only telephone service. Of course, any other combination of any other voice and/or data service can be provided to any customer premises depending on the service provider's capabilities and/or business plan.

The communication links 125, 130, 135 may be configured to support any communication protocol/standard, such as, but not limited to, IPTV, DSL, a fiber-optic communication standard, a cable television communication standard, etc. The communication links 125, 130, 135 may be implemented using any appropriate physical media, such as, for example, fiber-optic cables, coaxial cables, twisted wire pairs, microwave links, satellite links, radio frequency (RF) wireless links, etc. For example, the communication link 125 between the central office 105 and the customer premises 110 may be implemented via a fiber-optic link 155 from the central office 105 to a node interface 160 and then a copper link 165 from the node interface 160 to the customer premises 110. Such a configuration is known as a fiber to the node (FTTN) implementation. In such an implementation, the node interface 160 may be co-located with the customer premises 110 and allow fiber-optic cable to be used for most of the communication link 125 between the central office 105 and the customer premises 110 while simplifying installation by using the existing twisted pair wiring within the customer premises 110. Alternatively, the node interface 160 may be located in a neighborhood area and serve a plurality of customer premises 110. As another example, the communication link 135 between the central office 105 and the customer premises 120 may be implemented entirely via a fiber-optic cable. Such a configuration is known as a fiber to the premises (FTTP) implementation. The example link access management methods and apparatus disclosed herein are compatible with FTTN and/or FTTP implementations.

A more detailed block diagram of the example integrated broadband communication system 100 is shown in FIG. 2 in which like components in FIGS. 1 and 2 are labeled with the same reference numerals. The block diagram of FIG. 2 further illustrates the connections between the central office 105 and the sources of services 140, 145, 150 provided by the example integrated broadband communication system 100. For example, the central office 105 includes internally, and/or interfaces externally, with a plurality of switches and/or routers 205, 210, 215 to communicate with the sources of the services 140, 145, 150. The central office 105 also uses the plurality of switches and/or routers 205, 210, 215 to aggregate the services 140, 145, 150 for distribution within the example integrated broadband communication system 100. For example, the switches and/or routers 205, 210, 215 could be implemented by any type of switches and/or routers, such as, for example, asynchronous transfer mode (ATM) switches, frame relay switches, internet protocol (IP) switches, Ethernet routers, etc., and could be located in the central office 105 and/or at remote network locations.

In the illustrated example, the central office 105 communicates via the switches and/or routers 205 to a video head office 220 to obtain access to the video service 140. For example, the video head office 220 may include one or more video servers storing video content for distribution within the example integrated broadband communication system 100. Additionally, the central office 105 communicates via the switches and/or routers 210 to an internet service provider 225 to obtain access to the internet service 145. The internet service provider 225 may be the service provider of the example integrated broadband communication system 100, an affiliate or subsidiary of the service provider, a third-party internet service provider, etc.

To provide telephone service in the context of the offered triple play services, the example integrated broadband communication system 100 of FIG. 2 is configured to support voice over internet protocol (VoIP) telephone service. Thus, the central office 105 communicates via the switches and/or routers 215 to a voice gateway 230. The voice gateway 230 provides an interface between the standard public switched telephone (PSTN) service 150 and the VoIP telephone service offered within the example integrated broadband communication system 100.

The block diagram of FIG. 2 also illustrates the implementation of the example communication link 125 between the example central office 105 and the example customer premises 110 as well as the various services provided by the communication link 125 to the customer premises 110. For example, the central office 105 of the illustrated example includes an access node 235 to aggregate the services to be provided by the example integrated broadband communication system 100 and to implement the service provider termination of the communication link 125. The communication link 125 of the illustrated example is implemented via a FTTN configuration and, as such, the fiber-optic link 155 is used to implement the communication link 125 between the central office 105 and the node interface 160. A copper link 165 is then used to complete the communication link 125 between the node interface 160 and the customer premises 110. In the illustrated example, a DSL access technology, (e.g., such as VDSL or VDSL2) is used over the copper link 165 (or, more generally, the copper loop) to implement the communication link 125. As such, the node interface 160 includes a DSL access multiplexer (DSLAM) 240 to multiplex multiple DSL lines onto the fiber-optic link 155 which serves as a backbone link between the node interface 160 and the central office 105. For example, the DSLAM 240 may be used to route individual DSL links over individual copper links 165 to a plurality of customer premises 110 served by the node interface 160. Additionally or alternatively, the DSLAM 240 may be used to multiplex, or "bond," a plurality of DSL links to create a single logical DSL link over the copper link 165 to the single customer premises 110. DSL link bonding is discussed in greater detail below in the context of FIG. 3. Persons of ordinary skill in the art will appreciate that the DSLAM 240 could be located in the node interface 160, as shown, or at the central office 105, or at any other appropriate location in the example integrated broadband communication system 100.

At the customer premises 110 of the illustrated example, the communication link 125 is terminated at a routing gateway 245 that couples the communication link 125 to various customer premises equipment. In the illustrated example, the routing gateway 245 is coupled to a set-top box 250 that is further coupled to a television 255 to provide television service (e.g., IPTV) to the customer premises 110. The set-top box 250 and the television 255 may be implemented using any known set-top box and television technology. Also, the set-top box 250 may be separate from, or integrated in, the television 255. The routing gateway 245 of the illustrated example is further coupled to a computer 260 to provide internet service (e.g., including mail, web browsing, etc.) to the customer premises 110. The computer 260 may be implemented using any known computer technology, such as, for example, a desktop computer, a notebook computer, a personal digital assistant (PDA), an internet interface to the television 255 and/or a separate television, etc. Additionally, the routing gateway 245 of the illustrated example is coupled to the telephone 265 to provide telephone service to the customer premises 110. For example, the telephone 265 may be a VoIP telephone capable of directly coupling to the communication link 125, a standard plain old telephone service (POTS) telephone coupled to the communication link 125 via a VoIP interface included in the routing gateway 245, etc.

Persons of ordinary skill in the art will appreciate that the routing gateway 245 may be implemented using any gateway and/or routing technology. The routing gateway 245 may be integrated with the set-top box 250, or the routing gateway 245 and the set-top box 250 may be separate devices. Additionally or alternatively, the routing gateway 245 may also include wired and/or wireless internet router functionality to allow a plurality of internet-capable devices to share the internet services provided by the communication link 125.

Figure 3:
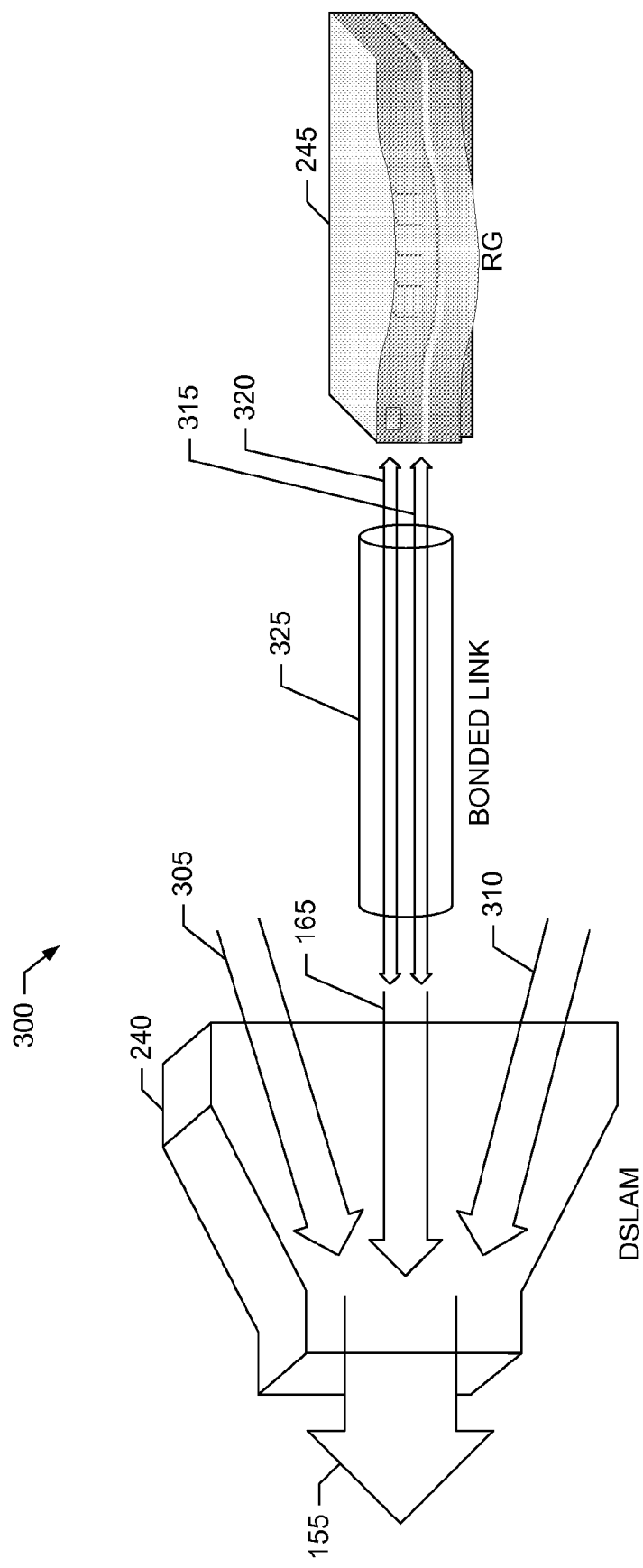
FIG. 3 is a block diagram illustrating a link bonding technique that may be used in the example integrated broadband communication system of FIG. 2.

As discussed above, the DSLAM 240 may support DSL link bonding in which a plurality of DSL links are combined to create a single logical DSL link over the copper link 165 to the single customer premises 110. As such, the bandwidth of each individual DSL link is combined via DSL bonding to create a higher available bandwidth over the communication link 125. To more fully understand DSL bonding in the context of the example integrated broadband communication system 100, an example DSL bonding configuration 300 is shown in FIG. 3. The example DSL bonding configuration 300 includes the DSLAM 240 of FIG. 2 which is configured to multiplex DSL cable links 165, 305 and 310 corresponding to three separate customer premises (not shown) onto the single fiber-optic backbone line 155. The example DSL bonding configuration 300 also includes the cable link 165 between the DSLAM 240 and the routing gateway 245 as shown in FIG. 2. However, in the illustrated example of FIG. 3, the cable link 165 is implemented by bonding two physical DSL links 315, 320 into a single logical bonded DSL link 325. The resulting bonded DSL link 325 is treated as a single connection between the DSLAM 240 and the routing gateway 245, but with the increased bandwidth associated with combining the two physical DSL links 315, 320.

The higher bandwidth of the bonded DSL link 325 results in a higher available bandwidth over the communication link 125 from the central office 105 to the customer premises 110. The higher bandwidth allows the example integrated broadband communication network 100 to supply premium services as part of the triple play services provided to the customer premises 110. For example, such premium services could include the ability to support more standard and/or high-definition televisions 255, the ability to provide higher-speed internet access, etc. However, in the case of link degradation or failure in conventional systems, the bonded DSL link 325 is treated as a single link and may be considered failed and be disabled even if only one of the physical DSL links 315, 320 suffers the degradation or failure. As such, in conventional implementations, bonded configurations typically have lower link reliability than non-bonded configurations.

To ensure sufficient bandwidth to support the integrated services (e.g., the triple play services) provided by the central office 105 to the customer premises 110 in the example integrated broadband communication system 100, the DSLAM 240 defines a loop profile that includes a maximum and minimum acceptable aggregated data rate over the communication link 125. The minimum acceptable rate is defined as the data rate required to deliver all of the services to which the subscriber has subscribed. The difference between the maximum and minimum acceptable aggregated data rate is typically a few Mbps. The DSLAM 240 and the routing gateway 245 negotiate an actual data rate for the communication link 125 based on present line conditions. For example, the DSLAM 240 and the routing gateway 245 may negotiate an actual data rate for the communication link 125 at power-on, at predetermined intervals of time, upon the occurrence of one or more predefined events, etc.

Various phenomena may cause the communication link to be unable to support the minimum acceptable aggregated data rate. Such phenomena may include, but are not limited to, weather outages, equipment outages, network maintenance outages, unexpected service interruptions, etc. For example, weather may have a negative impact on the quality of the local copper loop (e.g., the performance of the copper link 165 implementing the communication link 125). Typically, weather phenomena do not sever the local copper loop, but cause the local loop's performance to become severely degraded. Large weather disturbances may result in degraded performance for a significant period of time. Other factors that may lead to the degradation of the local loop including equipment wear, age, lack of maintenance, network events, etc.

In conventional implementations, the DSLAM 240 is not allowed to accept a negotiated data rate below the minimum acceptable aggregated data rate threshold as a way to guaranty delivery of all services to which the customer premises 110 has subscribed. If the negotiated data rate is below this aggregated threshold, the DSLAM 240 disables the communication link 125 in its entirety because there is insufficient bandwidth to support all services to which the customer premises 110 has subscribed. Such an implementation is not ideal, however, especially in the case of the DSL bonding configuration 300 of FIG. 3 discussed above, given the increased unreliability of bonded configurations. Furthermore, even though the negotiated data rate is below the minimum acceptable aggregated data rate required to support all subscribed services, the available data rate may still be sufficient to support one or more priority services. Examples of such priority services include: (1) emergency (e.g., 911) outgoing telephone calls to local police, fire, ambulance, etc., via the communication link 125, (2) alarm monitoring and notification at the customer premises via the communication link 125, and/or (3) medical reporting devices configured to report data to a medical facility via the communication link 125 for monitoring and possible medicine allocation. Of course, other services could be considered priority services depending on the particular application and loss of any or all of the priority services could be dangerous or even disastrous for the customer premises 110.

The following table illustrates example bandwidths (data rates) to support various services to be provided by the example integrated broadband communication system 100.

TABLE 1

Service Bandwidth Parameters

| Service | Bandwidth | Max. Quantity | Total Rate | Service Level |
|---|---|---|---|---|
| Standard Definition IPTV | 2.5 Mbps | 3 per premises | 7.5 Mbps | Moderate |
| High Definition IPTV | 10 Mbps | 1 | 10 Mbps | Minor |
| VoIP Telephone Line | 125 kbps | 4 per premises | 500 kbps | Priority |
| High Speed Internet | 1.5-6 Mbps | 1 | 1.5-6 Mbps | Minor |

As can be seen from the preceding table, there is a significant difference between the bandwidth (data rate) used for the priority VoIP telephone service and the bandwidth (data rate) used for the other services. Therefore, only a very small percentage of the minimum acceptable aggregated data rate is employed to support the priority services over the communication link 125. For example, the minimum acceptable aggregated bandwidth used to supply the triple-play services of high speed internet service, VoIP telephone service and IPTV video service could be, for instance, approximately 20 Mbps. According to the preceding table, a single VoIP telephone line requires only 125 kbps. Thus, the effective percentage of the overall minimum acceptable bandwidth required for the VoIP telephone line is approximately 0.6% ((125 kbps/20 Mbps) *100%). Unless the local copper loop is completely severed, it is highly improbable that enough bandwidth cannot be salvaged to provide this priority service even under severely unfavorable conditions.

Figure 4:
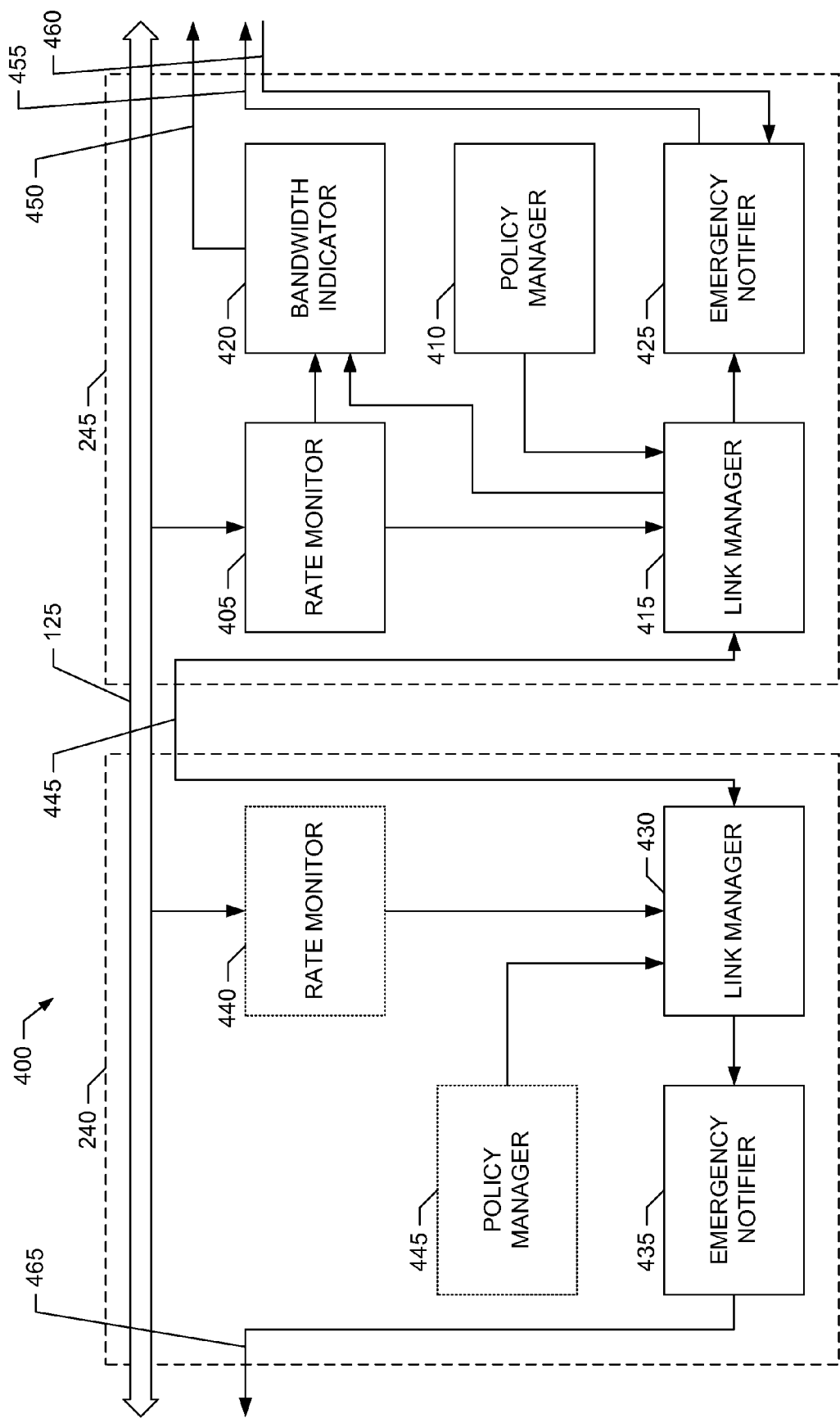
FIG. 4 is a block diagram of an example communication link, routing gateway (RG), digital subscriber line access multiplexer (DSLAM) and supporting link access modules that may be used in the broadband communication system of FIG. 2.

With the preceding in mind, an example link access management configuration 400 for use in the example integrated broadband communication system 100 of FIGS. 1-2 is shown in FIG. 4. The example link access management configuration 400 utilizes various link access modules implemented in the DSLAM 240 and routing gateway 245 to manage access to the communication link 125. In particular, the link access management configuration 400 enables the communication link 125 to provide priority services even if the negotiated (available) data rate falls below the minimum acceptable aggregated data rate required to provide all services to which the customer premises 110 has subscribed.

To support the link access management methods and apparatus disclosed herein, the example routing gateway 245 includes the following link access modules: a rate monitor 405, a link manager 410, a policy manager 415, a bandwidth indicator 420 and an emergency notifier 425. To also support the link access management methods and apparatus disclosed herein, the example DSLAM 240 includes the following link access modules: a link manager 430 and an emergency notifier 435. In some example implementation, the DSLAM 240 may also include a rate monitor 440 and a policy manager 445. Persons of ordinary skill in the art will appreciate that any or all of the rate monitor 405, the link manager 410, the policy manager 415, the bandwidth indicator 420 and/or the emergency notifier 425 may be integrated into one or more link access modules for inclusion in the example routing gateway 245. Persons of ordinary skill in the art will also appreciate that any or all of the link manager 430, the emergency notifier 435, the rate monitor 440 and/or the policy manager 445 may be integrated into one or more link access modules for inclusion in the example DSLAM 240.

In the example of FIG. 4, the rate monitor 405 included in the routing gateway 245 monitors the data rate available over the communication link 125. The rate monitor 405 may be implemented using any known technique or techniques for performing rate monitoring, such as, but not limited to, determining the number of received data packets received over the communication link 125 during a predetermined time interval, reading control and/or configuration information transmitted over the communication link 125, etc. Additionally, the rate monitor 405 may also monitor the communication link 125 for the presence of a heartbeat signal indicating that the communication link 125 is operational. The heartbeat signal may include, but is not limited to, a known data packet or information signal transmitted at predetermined time intervals, a signal transmitted continuously at a predetermined frequency, etc.

The link manager 410 included in the routing gateway 245 of the illustrated example receives the monitored data rate for the communication link 125 from the rate monitor 405. The link manager 410 also receives configuration information from the policy manager 415 specifying whether the customer premises 110 associated with the routing gateway 245 subscribes to one or more predetermined priority services. The configuration information received from the policy manager 415 may also specify the bandwidth (data rate) required to provide the one or more priority services and/or modified forms of the one or more priority services.

For example, the configuration information provided by the policy manager 415 may specify that VoIP service is a priority service and indicate whether the customer premises 110 subscribes to the VoIP telephone service. Additionally, the configuration information may specify that the VoIP telephone service requires a first priority bandwidth/data rate (e.g., such as 0.5 Mbps) to operate in an unmodified form and a second priority bandwidth/data rate (e.g., such as 0.2 Mbps)

to operate in a modified form. The unmodified form of the VoIP telephone service may correspond to allowing both incoming and outgoing phone calls with standard G.711 audio companding. The modified form of the VoIP telephone service may correspond to (a) allowing both incoming and outgoing phone calls but recompressed with G.729 audio companding, (b) allowing only emergency (e.g., 911) outgoing phone calls (e.g., calls from the customer premises) that are recompressed with G.729 audio companding, etc. Examples of other services that may be identified as priority services by the policy manager 415 include alarm monitoring and notification services, medical reporting/health monitoring services, etc. These priority bandwidths required for each of these additional example priority services may be the same as or different from the VoIP service discussed above.

Additionally or alternatively, the policy manager 415 provides configuration information to the link manager 410 specifying whether one or more priority services need to be provided to the customer premises 110 regardless of whether the routing gateway 245 subscribes to such services. For example, governmental regulatory schemes may require that service providers offer specified lifeline access to all customer premises 110. In such examples, the policy manager 415 may specify that the required lifeline access is a priority service for the customer premises 110. Furthermore, the configuration information provided by the policy manager 415 to the link manager 410 may include one or more priority bandwidths needed to provide the required lifeline access.

The link manager 410 included in the example routing gateway 245 of FIG. 4 uses the information provided by the rate monitor 405 and the policy manager 415 to negotiate with the example DSLAM 240 for access to the communication link 125. For example, the link manager 410 included in the example routing gateway 245 may negotiate with the link manager 430 included the example DSLAM 240 over a link management communication path 445 to determine an actual data rate for the communication link 125. The actual date rate negotiated by the link managers 410 and 430 may be based on (a) the available data rate determined by the rate monitor 405, (b) whether or not the customer premises 110 subscribes to any priority services as specified by the policy manager 415 and (c) the corresponding bandwidth/data rate requirements if the customer premises 110 subscribes to one or more priority services. As an example, if the available data rate over the communication link 125 is greater than the minimum acceptable aggregated data rate (e.g., such as 20 Mbps) for all services subscribed to by the customer premises 110, then the actual data rate for the communication link 125 may be negotiated as a value between the minimum acceptable aggregated data rate and the maximum acceptable aggregated data rate. If, however, the available data rate is less than the minimum acceptable aggregated data rate and the customer premises 110 does not subscribe to any predetermined priority services, the link managers 410 and 430 may negotiate to disable the communication link 125 entirely However, if the available data rate is less than the minimum acceptable aggregated data rate and the customer premises 110 subscribes to one or more predetermined priority services, the link managers 410 and 430 may negotiate multiple tiers of service to, thereby, keep the communication link 125 enabled for at least the priority services and at an actual data rate below the minimum acceptable aggregated data rate. For example, if a priority service subscribed to by the customer premises 110 is a VoIP telephone service and the available data rate is not less than a first priority data rate (e.g., such as 0.5 Mbps), the negotiated data rate may be a value sufficient to support both incoming and outgoing unmodified VoIP phone calls. If, however the available data rate is less than the first priority data rate (e.g., such as 0.5 Mbps) but not less than a second priority data rate (e.g., such as 0.2 Mbps), the negotiated data rate may be a value sufficient to support both incoming and outgoing VoIP phone calls, but with the calls recompressed to fit within the reduced available bandwidth. However, if the available data rate is less than the second priority data rate (e.g., such as 0.2 Mbps), the negotiated data rate may be a value sufficient to support only outgoing emergency (e.g., 911) VoIP phone calls that are recompressed to fit within the reduced available bandwidth.

Persons of ordinary skill in the art will appreciate that the communication link 125 itself may be used as the link management communication path 445 between the link manager 410 included in the example routing gateway 245 and the link manager 430 included in the example DSLAM 240. Additionally or alternatively, a communication link other the communication link 125 may be used to implement the link management communication path 445. For example, the link management communication path 445 could be implemented via a standard (e.g., PSTN) telephone link, a wireless link, a separate DSL link, etc.

The example routing gateway 245 of FIG. 4 also includes the bandwidth indicator 420 to provide one or more bandwidth indications that indicate the bandwidth and/or access status of the communication link 125. The bandwidth indicator 420 provides the one or more bandwidth indications via a bandwidth indicator output 450. The bandwidth indicator output 450 may be implemented by the communication link 125 in which the bandwidth indicator 420 outputs the one or more bandwidth indications as specially formatted messages to be transmitted over the communication link 125 to one or more devices for presentation in the customer premises 110. Additionally or alternatively, the bandwidth indicator output 450 may be implemented by a separate connection to couple the example routing gateway 245 to one or more devices for presentation in the customer premises 110. In either configuration, the bandwidth indicator output 450 may be configured to couple to, for example, the set-top box 250 and/or the television 255 of FIG. 2 to display the one or more bandwidth indications in the customer premises.

Any type of bandwidth indication may be output by the bandwidth indicator 420. For example, the bandwidth indicator 420 may output a bandwidth indication corresponding to the total available upstream bandwidth of the communication link 125. Additionally or alternatively, the bandwidth indicator 420 may output a bandwidth indication corresponding to the total available downstream bandwidth of the communication link 125. Furthermore, the bandwidth indicator 420 may output bandwidth indications that cause a chart to be displayed indicating the availability of the services subscribed to by the customer premises 110. For example, if the customer premises 110 subscribes to the "triple play services" then the chart generated by the bandwidth indicator 420 may included entries for video, VoIP and internet services, and may associate a green state indicator with a particular service if the service is enabled or may associate a red state indicator with a particular service if the service is disabled. Additionally, if the VoIP service is a predetermined priority service as discussed above, bandwidth indicator 420 may associate a green state indicator with the VoIP service if both incoming and outgoing calls are enabled, a yellow state indicator if only outgoing emergency (e.g., 911) calls are enabled, or a red state indicator if no VoIP service is available (e.g., such as when the communication link 125 is disabled because no heartbeat signal is detected by the rate monitor 405).

The example routing gateway 245 of FIG. 4 also includes the emergency notifier 425 to provide one or more emergency notifications to the customer premises 110 corresponding to one or more predetermined emergency conditions. The predetermined emergency conditions may correspond to, for example, a loss of heartbeat signal over the communication link 125, a drop in the VoIP service level below the green state (e.g., if only outgoing calls are enabled due to a reduction in available bandwidth), any service being disabled due to inadequate available bandwidth over the communication link 125, etc.

The emergency notifier 425 provides the one or more emergency notification via an emergency notification output 455. The emergency notification output 455 may be implemented by the communication link 125 in which the emergency notifier 425 outputs the one or more emergency notifications as one or more specially formatted messages to be transmitted over the communication link 125 to one or more devices for presentation in the customer premises 110. Additionally or alternatively, the emergency notification output 455 may be implemented by a separate connection to couple the example routing gateway 245 to one or more devices for presentation in the customer premises 110. In either configuration, the emergency notification output 455 may be configured to couple to, for example, the set-top box 250 and/or the television 255 of FIG. 2 to display the one or more emergency notification as alert messages viewable by persons in the customer premises 110. Additionally or alternatively, the emergency notification output 455 may be configured to couple to one or more telephones in the customer premises such that the emergency notifier 425 is able to ring the one or more telephones and play a prerecorded alert message to persons in the customer premises 110.

The emergency notifier 425 of the illustrated example includes an emergency configuration input 460 to allow a person in the customer premises to select whether or not the emergency notifier 425 should provide a notification via the emergency notification output 455 when service has been restored and, thus, the emergency condition is no longer present. The emergency configuration input 460 may be implemented by the communication link 125 in which the emergency notifier 425 receives one or more emergency configurations as one or more specially formatted messages over the communication link 125. Additionally or alternatively, the emergency configuration input 460 may be implemented by a separate connection to couple the example routing gateway 245 to one or more input devices in the customer premises 110. In either configuration, the emergency configuration input 460 may be configured to couple to, for example, the set-top box 250 and/or the television 255 of FIG. 2 to receive emergency configuration information input via, for example, a remote control device used to control the set-top box 250 and/or the television 255. Additionally or alternatively, emergency configuration input 460 may be configured to couple to one or more telephones in the customer premises such that the emergency configuration information may be entered by a person via one or more touch-tone commands.

To support emergency notifications on the network side, the example DSLAM 240 of FIG. 4 also includes the emergency notifier 435. When configured for use with the DSLAM 240, the emergency notifier 435 sends emergency notifications via an emergency notification output 465 to the service provider of the example integrated broadband communication system 100. The emergency notifications provided by the emergency notifier 435 may be generated in response to one or more predetermined emergency conditions associated with the communication link 125. Example predetermined emergency conditions include a loss of heartbeat signal over the communication link 125, negotiating an actual data rate for the communication link 125 that is less than the minimum acceptable, for example data rate, etc.

In the example of FIG. 4, the DSLAM 240 also includes the rate monitor 440 and the policy manager 445. As a result, the DSLAM 240 is capable of providing centralized link access management in contrast to the distributed link access management performed by the example routing gateway 245 discussed previously. The functionality of the rate monitor 440 and the policy manager 445 when included in the example DSLAM 240 is substantially the same as the functionality of the rate monitor 405 and policy manager 415 included in the example routing gateway 245. For example, the rate monitor 440 is configured to monitor the available data rate of the communication link 125 in a manner substantially similar to the operation of the rate monitor 405 discussed above. The policy manager 445, in turn, determines whether the customer premises 110 served by the communication link 125 subscribes to any priority services and, if so, the policy manager 445 specifies the parameters of those priority services. The functionality of the policy manager 445 is substantially similar to the functionality of the policy manager 415. As such, the rate monitor 440 and policy manager 445 are not discussed further herein and the interested reader is referred to the description of the rate monitor 405 and policy manager 415 provided above for further discussion concerning the functionality of these elements.

Flowcharts representative of example machine readable instructions that may be executed to implement the example DSLAM 240 of FIGS. 2-4, the example routing gateway 245 of FIGS. 2-4, and/or the example rate monitor 405, the example link manager 410, the example policy manager 415, the example bandwidth indicator 420, the example emergency notifier 425, the example link manager 430, the example emergency notifier 435, the example rate monitor 440 and/or the example policy manager 445 of FIG. 4 are shown in FIGS. 5, 6A-6B, and 7-9. In these examples, the machine readable instructions represented by one or more of the flowcharts may comprise one or more programs for execution by: (a) a processor, such as the processor 1012 shown in the example computer 1000 discussed below in connection with FIG. 10, (b) a controller, and/or (c) any other suitable device. The one or more programs may be embodied in software stored on a tangible medium such as, for example, a flash memory, a CD-ROM, a floppy disk, a hard drive, a DVD, or a memory associated with the processor 1012, but persons of ordinary skill in the art will readily appreciate that the entire program or programs and/or portions thereof could alternatively be executed by a device other than the processor 1012 and/or embodied in firmware or dedicated hardware in a well-known manner (e.g., implemented by an application specific integrated circuit (ASIC), a programmable logic device (PLD), a field programmable logic device (FPLD), discrete logic, etc.). For example, any or all of the example DSLAM 240, the example routing gateway 245, the example rate monitor 405, the example link manager 410, the example policy manager 415, the example bandwidth indicator 420, the example emergency notifier 425, the example link manager 430, the example emergency notifier 435, the example rate monitor 440 and/or the example policy manager 445 could be implemented by any combination of software, hardware, and/or firmware. Also, some or all of the machine readable instructions represented by the flowcharts of FIGS. 5, 6A-6B, and 7-9 may be implemented manually. Further, although the example machine readable instructions are described with reference to the flowcharts illustrated in FIGS.

5, 6A-6B, and 7-9, persons of ordinary skill in the art will readily appreciate that many other techniques for implementing the example methods and apparatus described herein may alternatively be used. For example, with reference to the flowcharts illustrated in FIGS. 5, 6A-6B, and 7-9, the order of execution of the blocks may be changed, and/or some of the blocks described may be changed, eliminated, combined and/or subdivided into multiple blocks.

Figure 5:
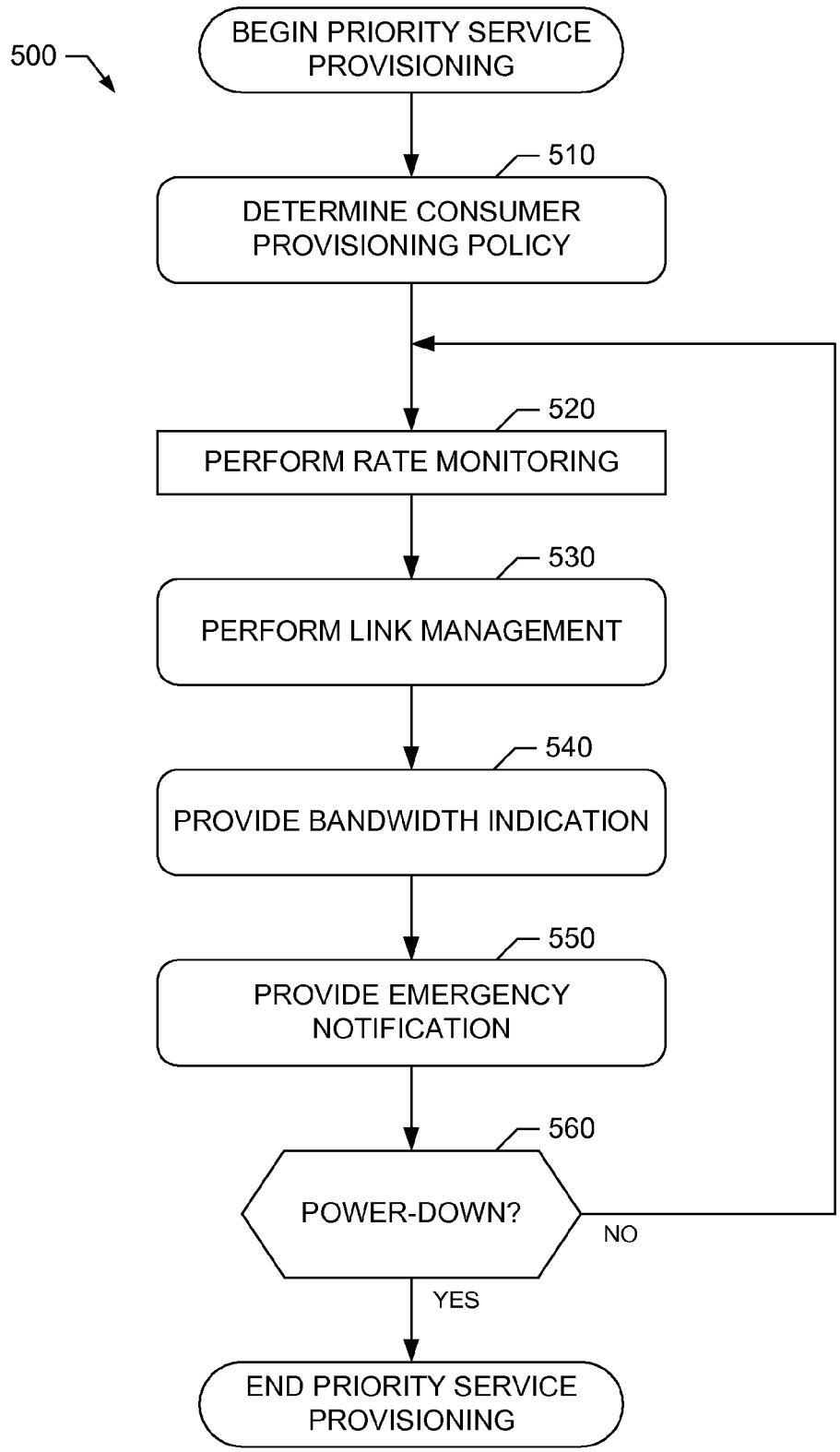
FIG. 5 is a flowchart representative of example machine readable instructions that may be executed to implement the link access modules of FIG. 4.

Example machine readable instructions 500 that may be executed to implement the example routing gateway 245 of FIG. 4 are shown in FIG. 5. The example machine readable instructions 500 may be executed at predetermined intervals, based on an occurrence of a predetermined event, etc., or any combination thereof. For example, the machine readable instructions 500 may be executed upon start-up of the routing gateway 245, whenever a service is activated or deactivated at the customer premises 110, at predetermined intervals, such as hourly, daily, etc. Additionally or alternatively, the example machine readable instructions may be executed upon the occurrence of trigger generated remotely, for example, at the central office 105, DSLAM 240, etc. and/or locally by, for example, a user input to the routing gateway 245.

The machine readable instructions 500 begin execution at block 510 at which the policy manager 415 included in the example routing gateway 245 determines the service provisioning associated with the routing gateway 245 and/or the customer premises 110 in which the routing gateway 245 is located. Specifically, the routing gateway 245 determines whether the customer service provisioning includes subscription(s) to one or more predetermined priority services. If the customer premises 110 does subscribe to one or more predetermined priority services, at block 510 the policy manager 415 may also determine configuration information associated with the one or more priority services. Such configuration information may include, for example, the bandwidth (data rate) required to provide the one or more priority services and/or modified forms of the one or more priority services, allowed modifications to the one or more priority services, etc. Control then proceeds to block 520 at which rate monitor 405 included in the example routing gateway 245 monitors the data rate available over the communication link 125. At block 520, the rate monitor 405 may also monitor the communication link 125 for the presence of a heartbeat signal indicating that the communication link 125 is operational.

Next, control proceeds to block 530 at which the link manager 410 included in the example routing gateway 245 uses the customer provisioning information determined at block 510 and the available data rate of the communication link 125 determined at block 520 to negotiate for access to the communication link 125. Such negotiation includes specifying an actual data rate to be used for transmitting data over the communication link 125. The actual date rate negotiated by the link manager 410 may be based on (a) the available data rate determined at block 510, (b) whether or not the customer premises 110 subscribes to any priority services as determined at block 520 and (c) the corresponding bandwidth/data rate requirements if the customer premises 110 subscribes to one or more priority services. At block 530, negotiation for access to the communication link 125 may also include specifying whether tiered service support is necessary (as opposed to a conventional all or nothing decision criteria to determine whether to enable or disable the communication link 125) and, if tiered service is required, specifying the service modification parameters associated with each supported tier of service. Example machine readable instructions that may be used to implement the processing at block 510 and 530 are illustrated in FIGS. 6A and 6B, respectively, and discussed in greater detail below.

Figure 7:
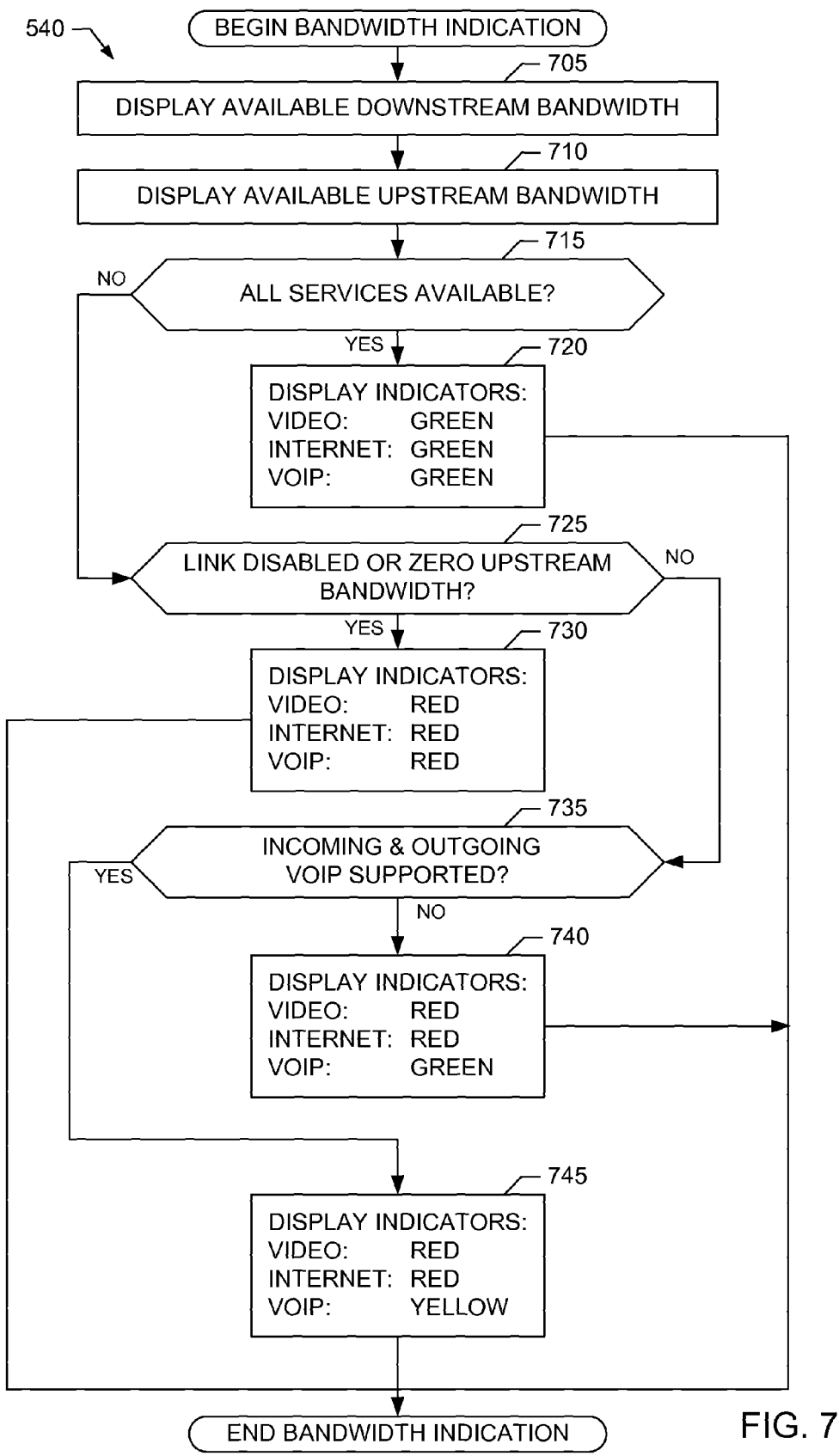
FIG. 7 is a flowchart representative of example machine readable instructions that may be executed to implement the example bandwidth indicator included in the example RG link access module of FIG. 4 and/or the corresponding functionality for the example machine readable instructions of FIG. 5.

After processing at block 530 completes, control proceeds to block 540 at which the bandwidth indicator 420 included in the example routing gateway 245 generates one or more bandwidth indications that indicate the bandwidth of and/or status of services provided by the communication link 125. The bandwidth indications may include the total available downstream and/or upstream bandwidth available on the communication link 125. The bandwidth indications may also include service status indications corresponding to a service being enabled, enabled with modification, partially enabled, disabled, etc. For example, a service that is enabled or enabled with modification(s) may correspond to a green state, a partially enabled service may correspond to a yellow state and a disabled service may correspond to a red state. Example machine readable instructions that may be used to implement the processing at block 540 are illustrated in FIG. 7 and discussed in greater detail below.

Figure 8:
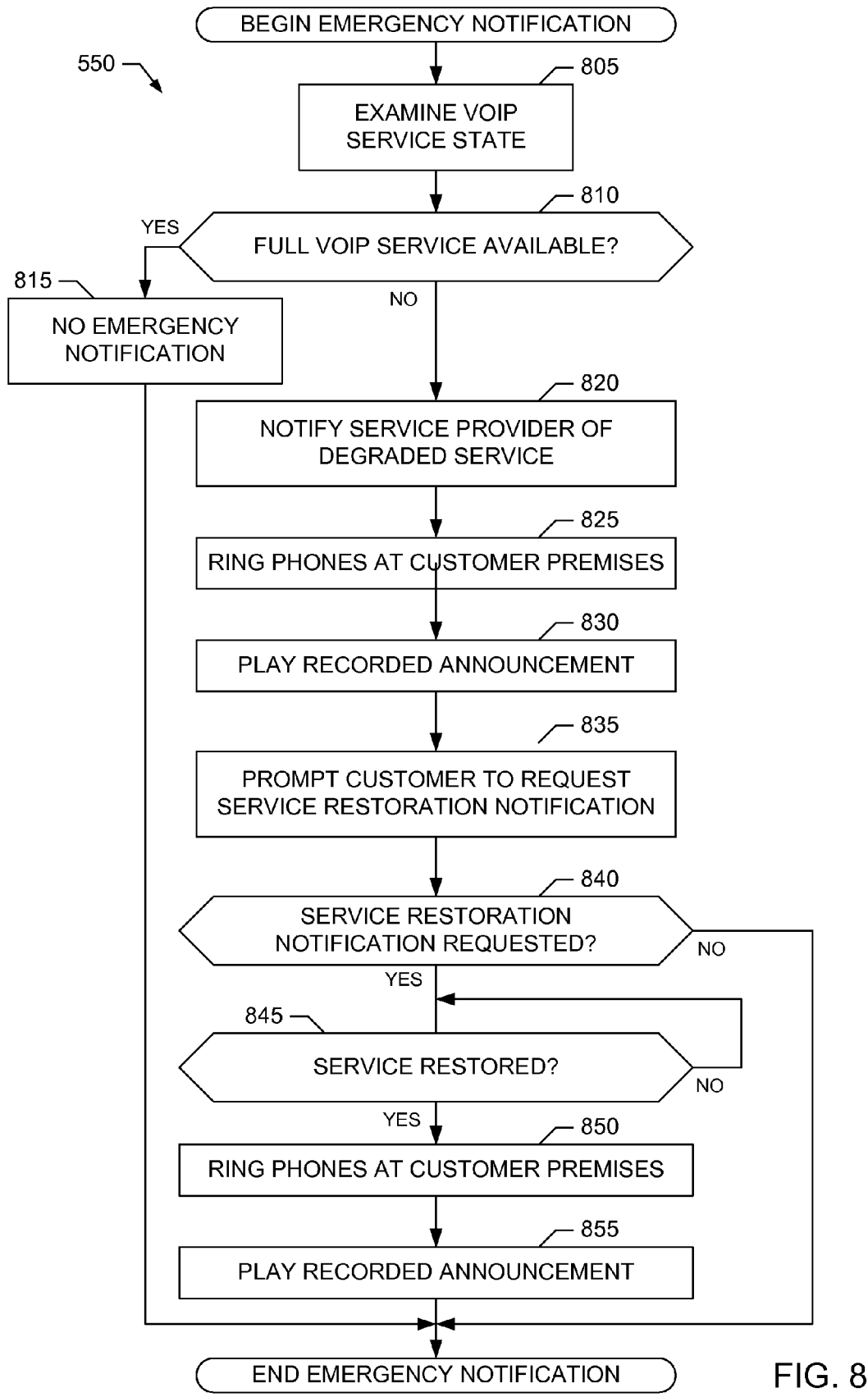
FIG. 8 is a flowchart representative of example machine readable instructions that may be executed to implement the example emergency notifier included in the example RG link access module of FIG. 4 and/or the corresponding functionality for the example machine readable instructions of FIG. 5.

Next, control proceeds to block 550 at which emergency notifier 425 included in the example routing gateway 245 generates one or more emergency notifications corresponding to one or more predetermined emergency conditions. The predetermined emergency conditions may correspond to, for example, a loss of heartbeat signal over the communication link 125, a drop in the service level below the green state (e.g., if only VoIP outgoing calls are enabled due to a reduction in available bandwidth), any service being disabled due to inadequate available bandwidth over the communication link 125, etc. Example machine readable instructions that may be used to implement the processing at block 550 are illustrated in FIG. 8 and discussed in greater detail below. To enable the example routing gateway 245 to continue performing link management, after processing at block 550 completes, control returns to block 520 and blocks subsequent thereto unless a power-down signal is detected at block 560. The power-down signal may correspond to an indication that a power and/or reset button on the example routing gateway 245 was depressed, and/or the service provisioning at the customer premises 110 was modified, etc. If a power-down signal is detected (block 560), execution of the example machine readable instructions 500 then ends.

Figure 6A:
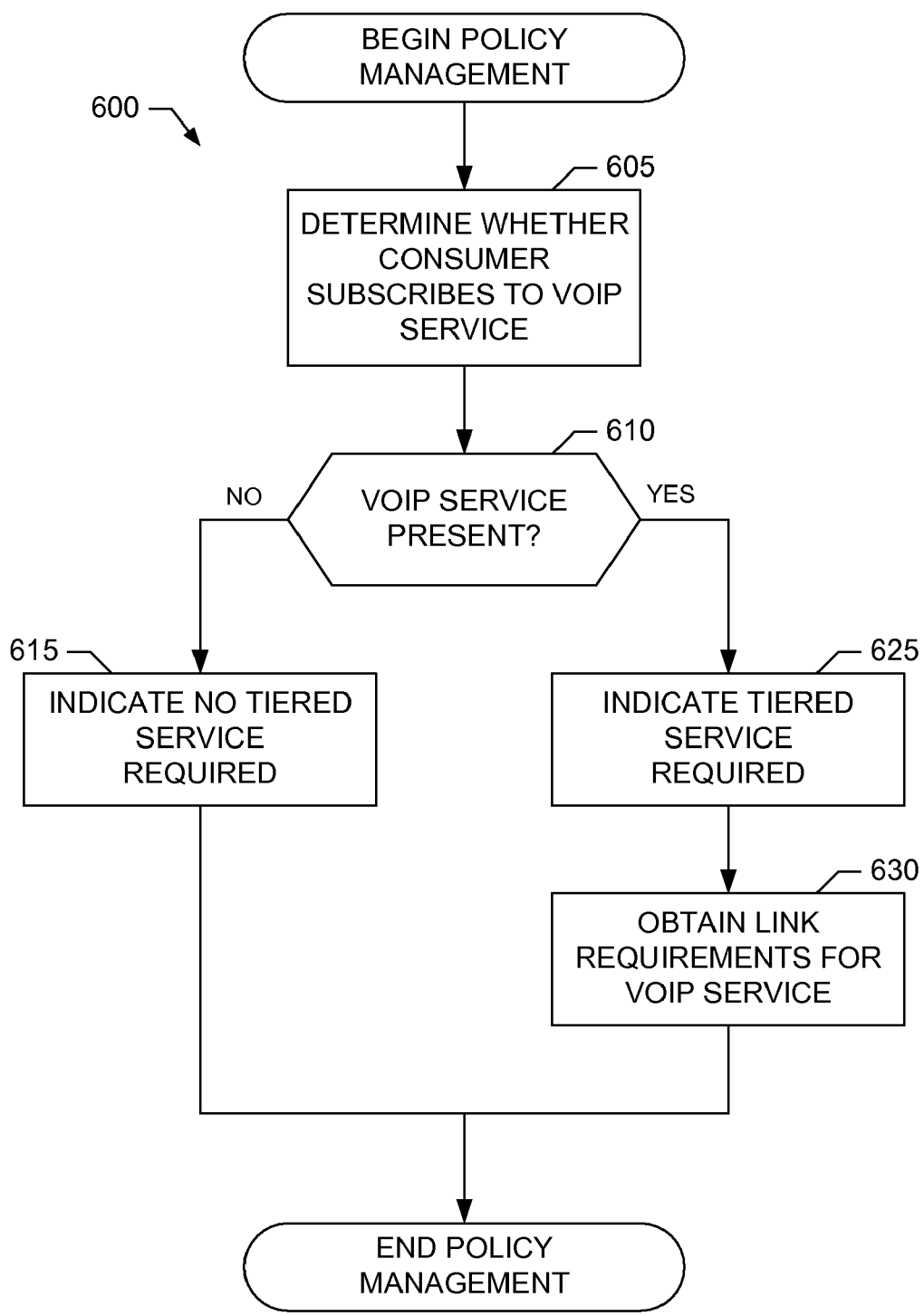
FIG. 6A is a flowchart representative of first example machine readable instructions that may be executed to implement the example policy manager and the example link manager included in the example RG link access module of FIG. 4 and/or the corresponding functionality for the example machine readable instructions of FIG. 5.
Figure 6B:
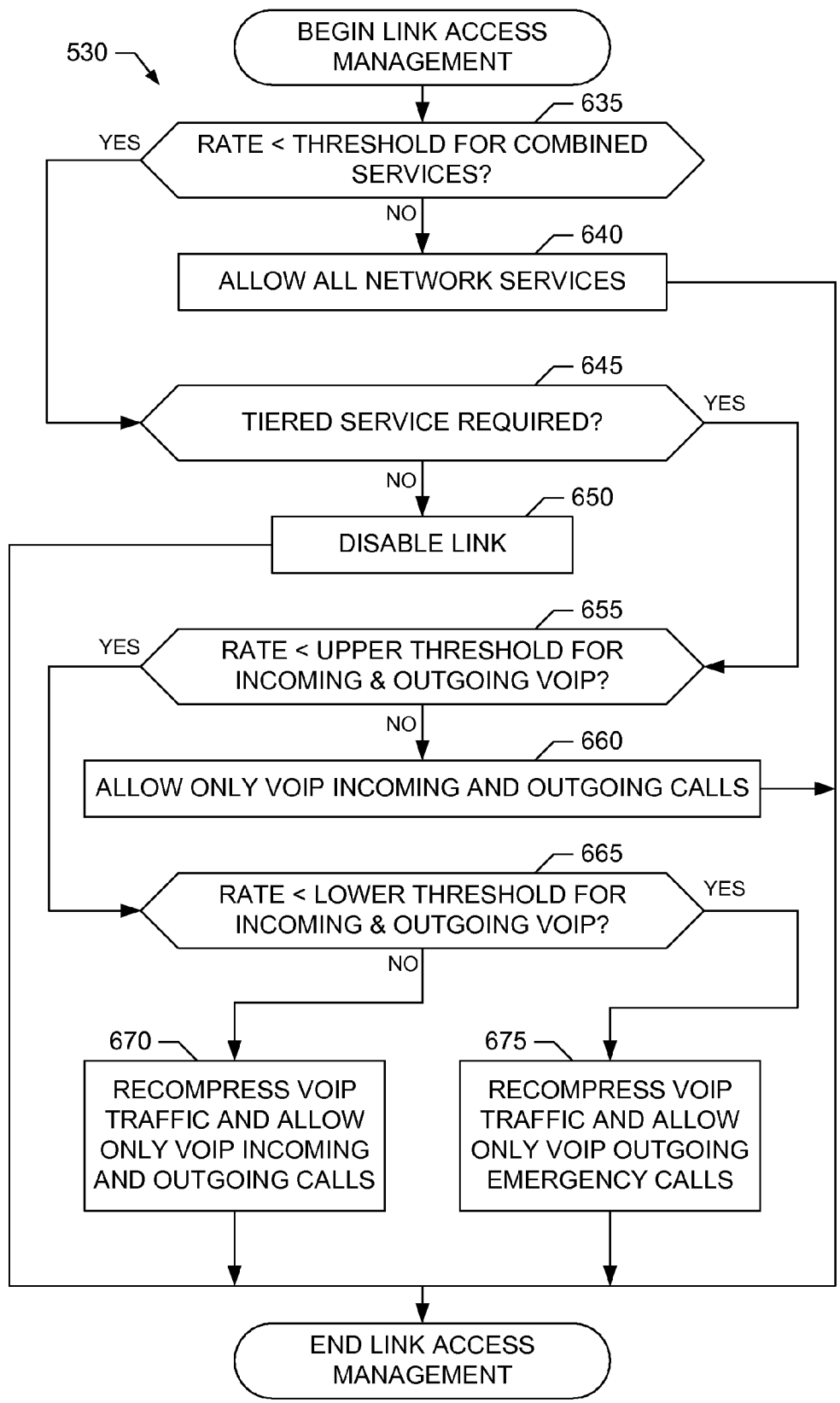
FIG. 6B is a flowchart representative of second example machine readable instructions that may be executed to implement the example policy manager and the example link manager included in the example RG link access module of FIG. 4 and/or the corresponding functionality for the example machine readable instructions of FIG. 5.

Example machine readable instructions 510 that may be used to implement the processing at block 510 of FIG. 5 are shown in FIG. 6A. Additionally or alternatively, the machine readable instructions 510 may be used to implement the link manager 410 and/or the policy manager 415 of FIG. 4. The example machine readable instructions 510 begin execution at block 605 at which the policy manager 415 included in the example routing gateway 245 determines the service provisioning associated with the routing gateway 245 and/or the customer premises 110 in which the routing gateway 245 is located. In particular, at block 605 the policy manager 415 determines whether VoIP telephone service, a priority service in the illustrated example, is utilized by the routing gateway 245 and, thus, the customer premises 110. Of course, in other example implementations, other service may be considered to be priority services, such as, for example, alarm monitoring and notification services, medical reporting/health monitoring services, etc. Additionally, at block 605 in the illustrated example, the policy manager 415 may determine the bandwidth/data rate requirements for the utilized VoIP service and any modified forms of the VoIP service supported by the routing gateway 245. For example, at block 605 the policy manager 415 may retrieve one or more subscriber records associated with the customer premises 110 and/or a particular customer located at the customer premises 110. The policy manager 415 may then determine whether the subscriber record indicates whether the customer premises 110 and/or the customer at the customer premises 110 subscribes to one or more predetermined priority services. The one or more subscriber records may be located locally in the example routing gateway 245 and/or remotely in, for example, the central office 105 and/or any other appropriate network element.

Next, control proceeds to block 610 at which the policy manager 415 and/or the link manager 410 included in the example routing gateway 245 determines whether the VoIP telephone service is utilized by the routing gateway 245 and/or associated customer premises 110 based on the provisioning information determined at block 605. If VoIP telephone service is not utilized by the routing gateway 245 and, thus, the associated customer premises 110 (block 610), control proceeds to block 615 at which the policy manager 415 and/or the link manager 410 determines that support for tiered services is not required over the communication link 125. Control then proceeds to block 520. However, if VoIP telephone service is utilized by the routing gateway 245 and, thus, the associated customer premises 110 (block 610), control proceeds to block 635 at which the policy manager 415 and/or the link manager 410 determines that support for tiered services is required over the communication link 125. Control then proceeds to block 640 at which the policy manager 415 and/or the link manager 410 obtains the bandwidth/data rate requirements for the utilized VoIP service and any modified forms of the VoIP service supported by the routing gateway 245 as determined at block 605.

For example, at blocks 635-640 the link manager 410 may receive information from the policy manager 415 that a first tier of VoIP service supporting incoming and outgoing unmodified VoIP phone calls may be supported when the data rate is not less than a first priority data rate (e.g., such as 0.5 Mbps). Additionally or alternatively, at blocks 635-640 the link manager 410 may receive information from the policy manager 415 that a second tier of VoIP service supporting incoming and outgoing modified (e.g., recompressed) VoIP phone calls may be supported when the data rate is not less than a second priority data rate (e.g., such as 0.2 Mbps). Additionally or alternatively, at blocks 635-30 the link manager 410 may receive information from the policy manager 415 that a third tier of VoIP service supporting only outgoing emergency (e.g., 911) modified (e.g., recompressed) VoIP phone calls may be supported when the data rate is less than the second priority data rate (e.g., such as 0.2 Mbps). Execution of the example machine readable instructions then end and, for example, control then returns to block 520 of FIG. 5.

Example machine readable instructions 530 that may be used to implement the processing at block 530 of FIG. 5 are shown in FIG. 6B. Additionally or alternatively, the machine readable instructions 530 may be used to implement the link manager 410 and/or the policy manager 415 of FIG. 4. The example machine readable instructions 530 begin execution at block 635 after, for example, the rate monitoring at block 520 of FIG. 5 completes and the link manager 410 is called to perform link management. At block 635, the link manager 410 examines the available data rate for the communication link 125 as measured by, for example, the rate monitor 405 at block 520 of FIG. 5. If the available data rate is not less than a minimum threshold (e.g., the minimum acceptable aggregated data rate) required to support the combined services to which the routing gateway 245 and/or customer premises 110 have subscribed (block 635), control proceeds to block 640. At block 640, the link manager 410 signals to, for example, the DSLAM 240 or another appropriate network element that the communication link 125 should be enabled for all network services to which the routing gateway 245 and/or customer premises 110 have subscribed. Additionally, at block 640 the link manager may negotiate an actual data rate for the communication link 125 that is at least equal to the minimum threshold (e.g., the minimum acceptable aggregated data rate) to thereby support the combined services. Execution of the example machine readable instructions 530 then ends and, for example, control proceeds to block 540 of FIG. 5.

If, however, the available data rate is less than the minimum threshold (e.g., the minimum acceptable aggregated data rate) required to support the combined services to which the routing gateway 245 and/or customer premises 110 have subscribed (block 635), control proceeds to block 645. At block 645 the link manager 410 determines whether support for tiered services is required over the communication link 125 based on, for example, the processing at block 615 or block 635 of FIG. 6A. If the link manager 410 determines that support for tiered services is not required over the communication link 125 (block 645), control proceeds to block 650 at which the link manager 410 signals to, for example, the DSLAM 240 or another appropriate network element that the communication link 125 should be disabled because the link is unable to guaranty the minimum acceptable aggregated data rate required to support the combined services to which the routing gateway 245 and/or customer premises 110 have subscribed. Execution of the example machine readable instructions 530 then ends and, for example, control proceeds to block 540 of FIG. 5.

However, if the link manager 410 determines that support for tiered services is required over the communication link 125 (block 645), control proceeds to block 655. At block 655 the link manager 410 determines whether the available data rate measured by, for example, the rate monitor 405 at block 520 is less than an upper threshold required to provide incoming and outgoing VoIP phone service. For example, this upper threshold may correspond to the first priority data rate discussed above that is required to support incoming and outgoing unmodified VoIP phone calls. If the available data rate is not less than the upper threshold required to provide incoming and outgoing VoIP phone service (block 655), control proceeds to block 660 at which the link manager 410 signals to, for example, the DSLAM 240 or another appropriate network element that the communication link 125 should be enabled for unmodified incoming and outgoing VoIP calls and disabled for all other network services to which the routing gateway 245 and/or customer premises 110 have subscribed. Additionally, at block 660 the link manager may negotiate an actual data rate for the communication link 125 that is at least equal to the upper threshold required to provide incoming and outgoing VoIP phone service (e.g., an actual data rate at least equal to the first priority data rate). Execution of the example machine readable instructions 530 then ends and, for example, control proceeds to block 540 of FIG. 5.

If, however, the available data rate is less than the upper threshold required to provide incoming and outgoing VoIP phone service (block 655), control proceeds to block 665 at which the link manager 410 determines whether the available data rate measured by, for example, the rate monitor 405 at block 520 is less than a lower threshold required to provide incoming and outgoing VoIP phone service. For example, this lower threshold may correspond to the second priority data rate discussed above that is required to support incoming and outgoing modified VoIP phone calls. If the available data rate is not less than the lower threshold required to provide incoming and outgoing VoIP phone service (block 665), control proceeds to block 670 at which the link manager 410 signals to, for example, the DSLAM 240 or another appropriate network element that the communication link 125 should be enabled for modified incoming and outgoing VoIP calls and disabled for all other network services to which the routing gateway 245 and/or customer premises 110 have subscribed. Additionally, at block 670 the link manager may signal to, for example, the DSLAM 240 or another appropriate network element that the modifications should include re-compressing incoming and outgoing calls from standard G.711 audio companding to G.729 audio companding. Furthermore, at block 670 the link manager may negotiate an actual data rate for the communication link 125 that is at least equal to the lower threshold required to provide incoming and outgoing VoIP phone service (e.g., an actual data rate at least equal to the second priority data rate). Execution of the example machine readable instructions 530 then ends and, for example, control proceeds to block 540 of FIG. 5.

However, if the available data rate is less than the lower threshold required to provide incoming and outgoing VoIP phone service (block 665), control proceeds to block 675 at which the link manager 410 signals to, for example, the DSLAM 240 or another appropriate network element that the communication link 125 should be enabled for modified emergency (e.g., 911) outgoing VoIP calls and disabled for incoming VoIP calls and all other network services to which the routing gateway 245 and/or customer premises 110 have subscribed. Additionally, at block 670 the link manager may signal to, for example, the DSLAM 240 or another appropriate network element that the modifications should include re-compressing the outgoing emergency (e.g., 911) calls from standard G.711 audio companding to G.729 audio companding. Furthermore, at block 670 the link manager may negotiate an actual data rate for the communication link 125 sufficient to provide only outgoing emergency (e.g., 911) VoIP service. It should be understood that the modified outgoing emergency (e.g., 911) calls may still permit bi-directional voice communication. Execution of the example machine readable instructions 530 then ends and, for example, control proceeds to block 540 of FIG. 5.

Example machine readable instructions 540 that may be used to implement the processing at block 540 of FIG. 5 are shown in FIG. 7. Additionally or alternatively, the machine readable instructions 540 may be used to implement the bandwidth indicator 420 of FIG. 4. The example machine readable instructions 540 of FIG. 7 begin execution at block 705 at which the bandwidth indicator 420 outputs a bandwidth indication corresponding to the total available downstream bandwidth of the communication link 125 for display via, for example, the set-top box 250 and/or the television 255 of FIG. 2. Then, at block 710 the bandwidth indicator 420 outputs a bandwidth indication corresponding to the total available upstream bandwidth of the communication link 125 for display via, for example, the set-top box 250 and/or the television 255. The downstream and/or upstream bandwidth may be displayed at blocks 705 and 710, respectively, in the form of a number, a displayed bar chart, a displayed color, etc.

Next, control proceeds to block 715 at which the bandwidth indicator 420 determines whether all network services (e.g., such as the triple play services of video, VoIP and internet) to which the routing gateway 245 and/or customer premises 110 have subscribed are enabled over the communication link 125. If all network services are enabled (block 715), control proceeds to block 720 at which the bandwidth indicator 420 may output bandwidth indications that cause a chart to be displayed via the set-top box 250 and/or the television 255 indicating that all network services are available.

For example, if the routing gateway 245 and/or customer premises 110 have subscribed to the triple play services of video/television service, VoIP service and internet service, at block 720 the chart generated by the bandwidth indications from the bandwidth indicator 420 may included entries for video, VoIP and internet services, and may associate a green state symbol for each of the video, VoIP and internet services to indicate that all the services are available. Execution of the example machine readable instructions 540 then ends.

However, if all network services are not enabled (block 715), control proceeds to block 725 at which the bandwidth indicator 420 determines whether the communication link 125 has been disabled and/or whether there is zero upstream bandwidth available over the communication link 125 (e.g., as measured by the rate monitor 405). If the communication link 125 has been disabled and/or there is zero upstream bandwidth available (block 725), control proceeds to block 730 at which the bandwidth indicator 420 may output bandwidth indications that cause a chart to be displayed via the set-top box 250 and/or the television 255 indicating that no network services are available. For example, if the routing gateway 245 and/or customer premises 110 have subscribed to the triple play services of video/television service, VoIP service and internet service, at block 730 the chart generated by the bandwidth indications from the bandwidth indicator 420 may included entries for video, VoIP and internet services, and may associate a red state symbol for each of the video, VoIP and internet services to indicate that all the services are unavailable. Execution of the example machine readable instructions 540 then ends.

If, however, the communication link 125 has not been disabled and there is upstream bandwidth available (block 725), control proceeds to block 735 which the bandwidth indicator 420 determines whether incoming and outgoing VoIP phone service (either unmodified or modified as discussed above) is supported over the communication link 125. If incoming and outgoing VoIP phone service is supported over the communication link 125 (block 735), control proceeds to block 740 at which the bandwidth indicator 420 may output bandwidth indications that cause a chart to be displayed via the set-top box 250 and/or the television 255 indicating that only incoming and outgoing VoIP service is available and no other network services are available. For example, if the routing gateway 245 and/or customer premises 110 have subscribed to the triple play services of video/television service, VoIP service and internet service, at block 740 the chart generated by the bandwidth indications from the bandwidth indicator 420 may included entries for video, VoIP and internet services, and may associate a green state symbol for the VoIP service and red state symbols for each of the video and internet services. Execution of the example machine readable instructions 540 then ends.

If, however, incoming and outgoing VoIP phone service is not supported over the communication link 125 (block 735), control proceeds to block 745 at which the bandwidth indicator 420 may output bandwidth indications that cause a chart to be displayed via the set-top box 250 and/or the television 255 indicating that only outgoing emergency (e.g., 911) VoIP service is available and no other network services are available. For example, if the routing gateway 245 and/or customer premises 110 have subscribed to the triple play services of video/television service, VoIP service and internet service, at block 745 the chart generated by the bandwidth indications from the bandwidth indicator 420 may included entries for video, VoIP and internet services, and may associate a yellow state symbol for the VoIP service and red state symbols for each of the video and internet services. Execution of the example machine readable instructions 540 then ends.

Example machine readable instructions 550 that may be used to implement the processing at block 550 of FIG. 5 are shown in FIG. 8. Additionally or alternatively, the machine readable instructions 550 may be used to implement the emergency notifier 425 of FIG. 4. The example machine readable instructions 550 of FIG. 8 begin execution at block 805 at which the emergency notifier 425 examines the state of the VoIP service available over the communication link 125. Then, at block 810 the emergency notifier 425 determines whether full (e.g., incoming and outgoing) VoIP service is available over the communication link 125. If full (e.g., incoming and outgoing) VoIP service is available (block 810), control proceeds to block 815 at which the emergency notifier 425 determines that no emergency notification is necessary. Execution of the example machine readable instructions 550 then ends. However, if full (e.g., incoming and outgoing) VoIP service is not available over the communication link 125 (block 810), control proceeds to block 820.

At block 820 the emergency notifier 425 sends an emergency notification to the service provider of the example integrated broadband communication system 100. The emergency notification notifies the service provider of a degradation of the priority VoIP service and may be sent over the communication link 125 itself and/or another communication link provided for emergency notifications (e.g., such as a backup PSTN phone link, a wireless link, a separate DSL link, etc.). Next, control proceeds to block 825 at which the emergency notifier 425 causes one or more telephones in the customer premises 110 to ring to gain the attention of persons residing therein. Then, at block 830, the emergency notifier 425 plays a prerecorded alert message to the person(s) answering the one or more phones rang in block 825. The alert message may be a recording notifying the person(s) answering the one or more phones that phone service is temporarily interrupted and, depending on the type of interruption, that only outgoing emergency (e.g., 911) calls are possible or that no outgoing or incoming calls are possible at the present time. Additionally or alternatively, at block 830 the emergency notifier 425 may cause similar visible and/or audible alert messages to be presented by the set-top box 250 and/or the television 255 of FIG. 2.

Next, control proceeds to block 835 at which the emergency notifier 425 prompts one or more persons in the customer premises 110 to request to be notified when VoIP service is restored. For example, at the conclusion of the emergency alert message(s) presented at block 830, the emergency notifier 425 may prompt the person(s) to enter a touch-tone command, enter a remote control command, etc. to request that the emergency notifier 425 (or, more generally from a customer's perspective, the example integrated broadband communication system 100) notify the person(s) when VoIP phone service has been restored. Then, at block 840 the emergency notifier 425 determines whether notification of service restoration was requested. If service restoration notification was not requested (block 840), execution of the example machine readable instructions 550 then ends. However, if service restoration notification was requested (block 840), control proceeds to block 845.

At block 845, the emergency notifier 425 waits until VoIP service is restored. Once service is restored (block 845), control proceeds to block 850 at which the emergency notifier 425 causes one or more telephones in the customer premises 110 to ring to gain the attention of persons residing therein. Then, at block 855, the emergency notifier 425 plays a prerecorded alert message to the person(s) answering the one or more phones that rang in block 850. The alert message may be a recording notifying the person(s) answering the one or more phones that phone service has been restored and that both outgoing and incoming calls are possible at the present time. Additionally or alternatively, at block 855 the emergency notifier 425 may cause similar visible and/or audible alert messages to be presented by the set-top box 250 and/or the television 255. Execution of the example machine readable instructions 855 then ends.

Figure 9:
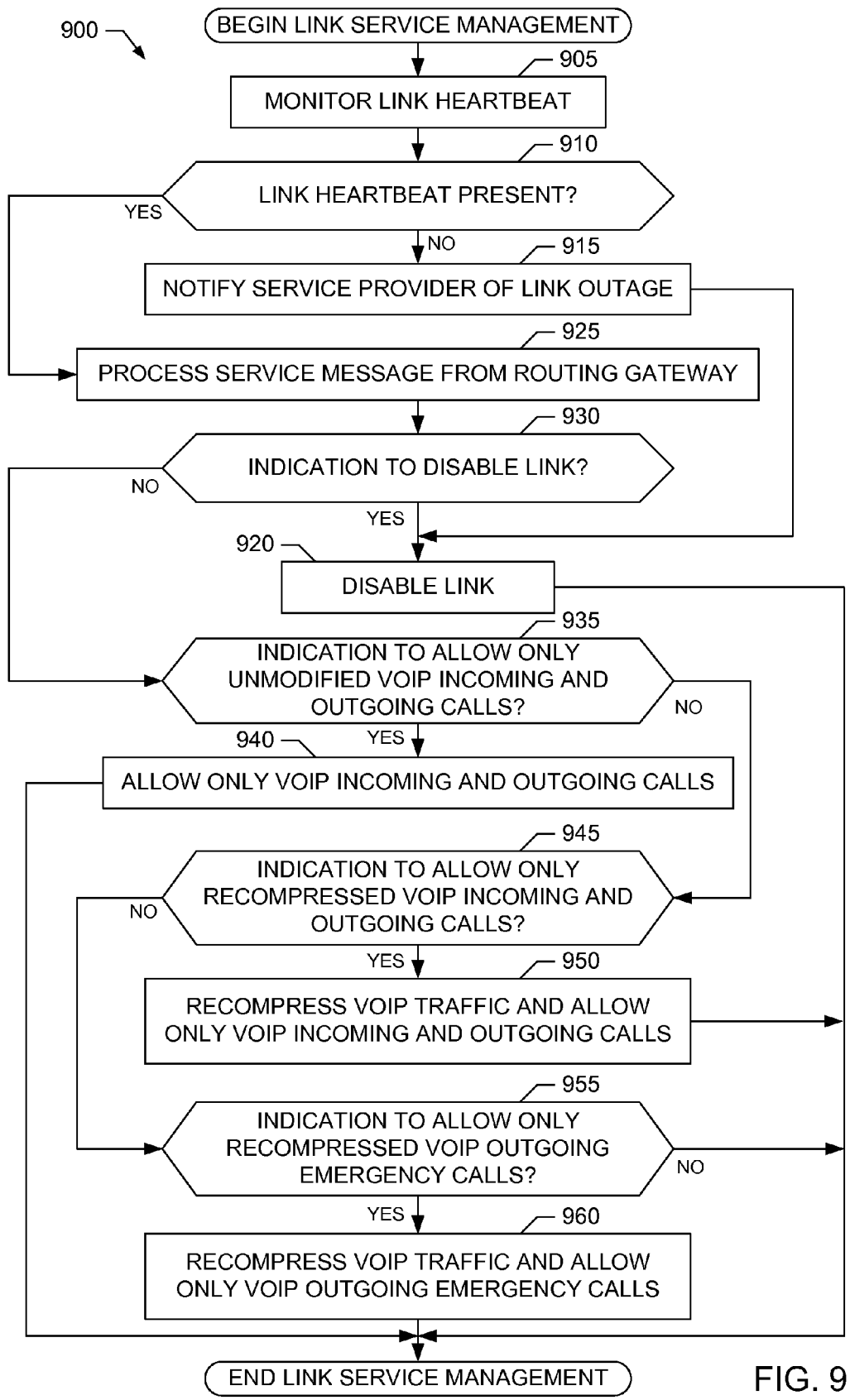
FIG. 9 is a flowchart representative of example machine readable instructions that may be executed to implement the example link manager and the example emergency notifier included in the example DSLAM link access module of FIG. 4 and/or the corresponding functionality for the example machine readable instructions of FIG. 5.

Example machine readable instructions 900 that may be executed to implement the example DSLAM 240 of FIG. 4 are shown in FIG. 9. The example machine readable instructions 900 may be executed at predetermined intervals, based on an occurrence of a predetermined event, etc., or any combination thereof. For example, the machine readable instructions 900 may be continuously executed upon start-up of the DSLAM 240, start-up of any routing gateway 245 coupled with the DSLAM 240, whenever a service is activated or deactivated at a customer premises 110 served by the DSLAM 240, at predetermined intervals, such as hourly, daily, etc.

The machine readable instructions 900 begin execution at block 905 at which the link manager 430 and/or rate monitor 440 included in the example DSLAM 240 monitor the communication link 125 for the presence of a heartbeat signal. The heartbeat signal may include, but is not limited to, a known data packet or information signal transmitted at predetermined time intervals, a signal transmitted continuously at a predetermined frequency, etc. Control then proceeds to block 910 at which the link manager 430 determines whether the heartbeat signal is present on the communication link 125 based on the monitoring at block 905. If the heartbeat signal is not present (block 910), control proceeds to block 915 at which the emergency notifier 435 included in the example DSLAM 240 sends an emergency notification to the service provider of the example integrated broadband communication system 100. The emergency notification notifies the service provider that the communication link 125 has been disrupted so arrangements can be made to, for example, repair operation of the communication link 125. Control then proceeds to block 920 at which the link manager 430 included in the example DSLAM 240 disables the communication link 125. The communication link 125 may remain disabled until, for example, the service provider issues a notification to the DSLAM 240 that the communication link 125 has been repaired. Execution of the example machine readable instructions 900 then ends.

If, however, the heartbeat signal is present on the communication link 125 (block 910), control proceeds to block 925 at which the link manager 430 processes service control messages received from the link manager 410 included in the example routing gateway 245. Such service control messages may include, but are not limited to, indications to enable one or more services, indications to disable one or more services, indications to modify one or more services, data rate negotiation messages, etc. Control proceeds to block 930 at which the link manager 430 determines whether any received control message indicates that the communication link 125 should be disabled, for example, due to insufficient bandwidth monitored by the routing gateway 245, a lack of heartbeat signal at the routing gateway 245, etc. If any received control message indicates that the communication link 125 should be disabled (block 930), control proceeds to block 920 at which the link manager 430 included in the example DSLAM 240 disables the communication link 125. Execution of the example machine readable instructions 900 then ends.

However, if no received control message indicates that the communication link 125 should be disabled (block 930), control proceeds to block 935 at which the link manager 430 determines whether any received control message indicates that only unmodified incoming and outgoing VoIP phone service should be enabled over the communication link 125. If any received control message indicates that only unmodified incoming and outgoing VoIP phone service should be enabled (block 935), control proceeds to block 940 at which the link manager 430 enables only unmodified incoming and outgoing VoIP phone service for the communication link 125 and disables all other network services to which the corresponding routing gateway 245 and/or customer premises 110 have subscribed. Execution of the example machine readable instructions 900 then ends.

If, however, no received control message indicates that only unmodified outgoing and incoming VoIP phone service should be enabled (block 935), control proceeds to block 945 at which the link manager 430 determines whether any received control message indicates that only recompressed (or, more generally, modified) incoming and outgoing VoIP phone service should be enabled over the communication link 125. If any received control message indicates that only recompressed incoming and outgoing VoIP phone service should be enabled (block 945), control proceeds to block 950 at which the link manager 430 enables only recompressed incoming and outgoing VoIP phone service for the communication link 125 and disables all other network services to which the corresponding routing gateway 245 and/or customer premises 110 have subscribed. Additionally, at block 950 the link manager 430 may specify the recompression parameters, such as recompressing from standard G.711 audio companding to G.729 audio companding. Execution of the example machine readable instructions 900 then ends.

Figure 10:
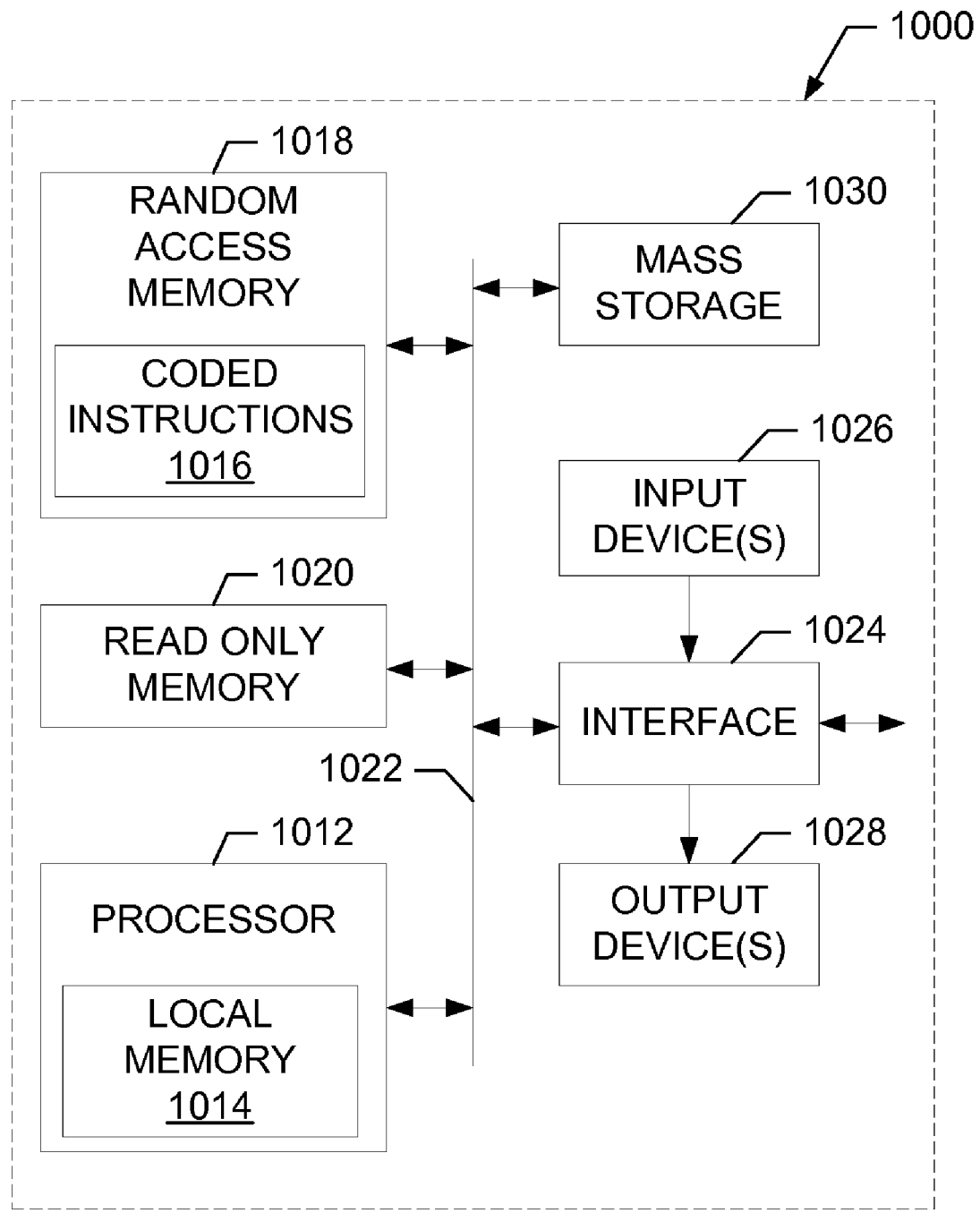
FIG. 10 is a block diagram of an example computer that may execute the example machine readable instructions of FIGS. 5, 6A-6B, 7, 8 and/or 9 to implement the example link access modules of FIG. 4.

However, if no received control message indicates that only recompressed outgoing and incoming VoIP phone service should be enabled (block 945), control proceeds to block 955 at which the link manager 430 determines whether any received control message indicates that only recompressed (or, more generally, modified) outgoing emergency (e.g., 911) VoIP phone service should be enabled over the communication link 125. If no received control message indicates that only recompressed outgoing emergency (e.g., 911) VoIP phone service should be enabled (block 955), execution of the example machine readable instructions 900 then ends. If, however, any received control message indicates that only recompressed outgoing emergency (e.g., 911) VoIP phone service should be enabled (block 955), control proceeds to block 960 at which the link manager 430 enables only recompressed outgoing emergency (e.g., 911) VoIP phone service for the communication link 125 and disables all other network services, including incoming VoIP service, to which the corresponding routing gateway 245 and/or customer premises 110 have subscribed. Additionally, at block 960 the link manager 430 may specify the recompression parameters, such as recompressing from standard G.711 audio companding to G.729 audio companding. Execution of the example machine readable instructions 900 then ends FIG. 10 is a block diagram of an example computer 1000 capable of implementing the apparatus and methods disclosed herein. The computer 1000 can be, for example, a server, a personal computer, a personal digital assistant (PDA), an internet appliance, a DVD player, a CD player, a digital video recorder, a personal video recorder, a set top box, or any other type of computing device. Persons of ordinary skill in the art will appreciate that any or all of the example DSLAM 240 of FIGS. 2-4, the example routing gateway 245 of FIGS. 2-4, and/or the example rate monitor 405, the example link manager 410, the example policy manager 415, the example bandwidth indicator 420, the example emergency notifier 425, the example link manager 430, the example emergency notifier 435, the example rate monitor 440 and/or the example policy manager 445 of FIG. 4 may be implemented in and/or implemented by the example computer 1000.

The system 1000 of the instant example includes a processor 1012 such as a general purpose programmable processor. The processor 1012 includes a local memory 1014, and executes coded instructions 1016 present in the local memory 1014 and/or in another memory device. The processor 1012 may execute, among other things, the machine readable instructions represented in FIGS. 5, 6A-6B, and 7-9. The processor 1012 may be any type of processing unit, such as one or more microprocessors from the Intel® Centrino® family of microprocessors, the Intel® Pentium® family of microprocessors, the Intel® Itanium® family of microprocessors, and/or the Intel XScale® family of processors. Of course, other processors from other families are also appropriate.

The processor 1012 is in communication with a main memory including a volatile memory 1018 and a non-volatile memory 1020 via a bus 1022. The volatile memory 1018 may be implemented by Static Random Access Memory (SRAM), Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1020 may be implemented by flash memory and/or any other desired type of memory device. Access to the main memory 1018, 1020 is typically controlled by a memory controller (not shown) in a conventional manner.

The computer 1000 also includes a conventional interface circuit 1024. The interface circuit 1024 may be implemented by any type of well known interface standard, such as an Ethernet interface, a universal serial bus (USB), and/or a third generation input/output (3GIO) interface.

One or more input devices 1026 are connected to the interface circuit 1024. The input device(s) 1026 permit a user to enter data and commands into the processor 1012. The input device(s) can be implemented by, for example, a keyboard, a mouse, a touchscreen, a track-pad, a trackball, an isopoint and/or a voice recognition system.

One or more output devices 1028 are also connected to the interface circuit 1024. The output devices 1028 can be implemented, for example, by display devices (e.g., a liquid crystal display, a cathode ray tube display (CRT)), by a printer and/or by speakers. The interface circuit 1024, thus, typically includes a graphics driver card.

The interface circuit 1024 also includes a communication device such as a modem or network interface card to facilitate exchange of data with external computers via a network (e.g., an Ethernet connection, a digital subscriber line (DSL), a telephone line, coaxial cable, a cellular telephone system, etc.).

The computer 1000 also includes one or more mass storage devices 1030 for storing software and data. Examples of such mass storage devices 1030 include floppy disk drives, hard drive disks, compact disk drives and digital versatile disk (DVD) drives.

At least some of the above described example methods and/or apparatus are implemented by one or more software and/or firmware programs running on a computer processor. However, dedicated hardware implementations including, but not limited to, application specific integrated circuits, programmable logic arrays and other hardware devices can likewise be constructed to implement some or all of the example methods and/or apparatus described herein, either in whole or in part. Furthermore, alternative software implementations including, but not limited to, distributed processing or component/object distributed processing, parallel processing, or virtual machine processing can also be constructed to implement the example methods and/or apparatus described herein.

It should also be noted that the example software and/or firmware implementations described herein are optionally stored on a tangible storage medium, such as: a magnetic medium (e.g., a magnetic disk or tape); a magneto-optical or optical medium such as an optical disk; or a solid state medium such as a memory card or other package that houses one or more read-only (non-volatile) memories, random access memories, or other re-writable (volatile) memories; or a signal containing computer instructions. A digital file attached to e-mail or other information archive or set of archives is considered a distribution medium equivalent to a tangible storage medium. Accordingly, the example software and/or firmware described herein can be stored on a tangible storage medium or distribution medium such as those described above or successor storage media.

To the extent the above specification describes example components and functions with reference to particular standards and protocols, it is understood that the scope of this patent is not limited to such standards and protocols. For instance, each of the standards for internet and other packet switched network transmission (e.g., Transmission Control Protocol (TCP)/Internet Protocol (IP), User Datagram Protocol (UDP)/IP, HyperText Markup Language (HTML), HyperText Transfer Protocol (HTTP)) represent examples of the current state of the art. Such standards are periodically superseded by faster or more efficient equivalents having the same general functionality. Accordingly, replacement standards and protocols having the same functions are equivalents which are contemplated by this patent and are intended to be included within the scope of the accompanying claims.

Additionally, although this patent discloses example systems including software or firmware executed on hardware, it should be noted that such systems are merely illustrative and should not be considered as limiting. For example, it is contemplated that any or all of these hardware and software components could be embodied exclusively in hardware, exclusively in software, exclusively in firmware or in some combination of hardware, firmware and/or software. Accordingly, while the above specification described example systems, methods and articles of manufacture, persons of ordinary skill in the art will readily appreciate that the examples are not the only way to implement such systems, methods and articles of manufacture. Therefore, although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A method for at least one of a routing gateway or a network interface to manage access to a communication link provided to a customer premises, the method comprising:
   determining a data rate for the communication link;
   determining whether the customer premises utilizes a predetermined service;
   electronically identifying the communication link as disabled when the customer premises does not utilize the predetermined service and the data rate is below a first rate sufficient to support all services utilized by the customer premises;
   electronically identifying the communication link as enabled for the predetermined service and disabled for at least one other service when the customer premises utilizes the predetermined service and the data rate is below the first rate and above a second rate sufficient to support the predetermined service without modification; and
   electronically identifying the communication link as enabled for a modified form of the predetermined service and disabled for other services when the customer premises utilizes the predetermined service and the data rate is below the second rate and above a third rate sufficient to support the modified form of the predetermined service.

2. A method as defined in claim 1 wherein the communication link comprises at least one of an internet protocol television (IPTV) link, a digital subscriber line (DSL) link, a fiber-optic link or a cable television link.

3. A method as defined in claim 1 wherein the predetermined service comprises a voice over internet protocol (VoIP) service.

4. A method as defined in claim 1 wherein the other services comprise at least one of internet service or internet protocol television (IPTV).

5. A method as defined in claim 1 wherein determining whether the customer premises utilizes the predetermined service comprises:
   retrieving a subscriber record associated with at least one of the customer premises or a customer located at the customer premises; and
   determining if the subscriber record indicates that at least one of the customer premises or the customer at the customer premises subscribes to the predetermined service.

6. A method as defined in claim 1 wherein identifying the communication link as enabled for the predetermined service and disabled for the at least one other service comprises identifying the communication link as enabled for the predetermined service and disabled for all other services.

7. A method as defined in claim 1 wherein the predetermined service comprises a voice over internet protocol (VoIP) service utilizing a first audio companding standard and the modified form of the predetermined service comprises a recompressed VoIP service utilizing a second audio companding standard.

8. A method as defined in claim 7 wherein the modified form of the predetermined service further comprises restricting the recompressed VoIP service to supporting only outgoing calls.

9. A method as defined in claim 1 further comprising providing a bandwidth indication at the customer premises to indicate at least one of the data rate for the communication link or an availability status for all services utilized by the customer premises.

10. A method as defined in claim 1 further comprising providing an emergency notification to at least one of the customer premises or a service provider when the data rate is below the first rate.

11. A method as defined in claim 1 further comprising determining whether a heartbeat signal is present on the communications link and providing an emergency notification to at least one of the customer premises or a service provider if the heartbeat signal is not present.

12. A method for one or more network processing elements to manage access to a communication link provided to a customer premises, the method comprising: determining a data rate for the communication link; determining whether a plurality of services to which the customer premises is subscribed includes a priority service requiring a data rate substantially less than a first rate sufficient to support all of the plurality of services to which the customer premises is subscribed; when the customer premises is determined to not be subscribed to the priority service, electronically identifying the communication link as disabled for all of the plurality of services when the data rate is below the first rate; and when the customer premises is determined to be subscribed to the priority service: electronically identifying the communication link as enabled for an unmodified form of the priority service but disabled for all other services in the plurality of services when the data rate is below the first rate and above a second rate sufficient to support the priority service without modification; and electronically identifying the communication link as enabled for a modified form of the priority service but disabled for all other services in the plurality of services when the data rate is below the second rate and above a third rate sufficient to support the priority service with modification.

13. A method as defined in claim 12 further comprising displaying an alert message on a display device located in the customer premises when the data rate is below the first rate.

14. A method for one or more network processing elements to manage access to a communication link provided to a customer premises, the method comprising: determining a data rate for the communication link; determining whether a plurality of services to which the customer premises is subscribed includes a voice over internet protocol (VoIP) service; when the customer premises is determined to not be subscribed to the VoIP service, electronically identifying the communication link as disabled for all of the plurality of services when the data rate is below a first rate sufficient to support all of the plurality of services to which the customer premises is subscribed; and when the customer premises is determined to be subscribed to the VoIP service: electronically identifying the communication link as enabled for an unmodified form of the VoIP service, but disabled for all other services in the plurality of services, when the data rate is below the first rate and above a second rate sufficient to support the VoIP service without modification; and electronically identifying the communication link as enabled for a modified form of the VoIP service that is recompressed to support second audio companding different from first audio companding supported by the unmodified from of the VoIP service, but disabled for all other services in the plurality of services, when the data rate is below the second rate and above a third rate sufficient to support the VoIP service with modification.

15. A method as defined in claim 14 further comprising electronically identifying the communication link as enabled for outgoing calls supported by the modified form of the VoIP service, but disabled for incoming calls supported by the modified form of the VoIP service and for all other services in the plurality of services, when the data rate is below the third rate.

16. A method as defined in claim 15 electronically generating an emergency notification when the data rate is below the third rate but not when the data rate is above the third rate.

17. A method as defined in claim 14 further comprising automatically ringing a phone located in the customer premises and playing a prerecorded alert message when the communication link is not identified as enabled for the unmodified form of the VoIP service.

18. A method as defined in claim 17 further comprising automatically ringing the phone located in the customer premises and playing a second prerecorded alert message when the communication link is identified as restored for the unmodified form of the VoIP service.

* * * * *